United States Patent
Dai et al.

(10) Patent No.: US 10,624,003 B2
(45) Date of Patent: Apr. 14, 2020

(54) METHOD FOR HANDOVER BETWEEN SECONDARY BASE STATIONS, NETWORK DEVICE, AND USER EQUIPMENT

(71) Applicant: Huawei Technologies Co., Ltd., Shenzhen (CN)

(72) Inventors: Mingzeng Dai, Shanghai (CN); Qufang Huang, Shanghai (CN); Jian Zhang, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/887,369

(22) Filed: Feb. 2, 2018

(65) Prior Publication Data

US 2018/0160336 A1 Jun. 7, 2018

Related U.S. Application Data

(63) Continuation of application No. PCT/CN2015/086057, filed on Aug. 4, 2015.

(51) Int. Cl.
*H04W 36/00* (2009.01)
*H04W 36/28* (2009.01)
(Continued)

(52) U.S. Cl.
CPC ... *H04W 36/0016* (2013.01); *H04W 36/0069* (2018.08); *H04W 36/08* (2013.01);
(Continued)

(58) Field of Classification Search
CPC ......... H04W 36/0016; H04W 36/0069; H04W 36/38; H04W 36/22; H04W 36/08; H04W 36/30; H04W 36/28; H04W 36/36
See application file for complete search history.

(56) References Cited

U.S. PATENT DOCUMENTS

2014/0045494 A1\* 2/2014 Pekonen ........... H04W 36/0005
455/434
2014/0269575 A1\* 9/2014 Zhang ................. H04W 72/042
370/329
(Continued)

FOREIGN PATENT DOCUMENTS

CN 103139911 A 6/2013
CN 103428788 A 12/2013
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300, V12.4.0, pp. 1-251, 3rd Generation Partnership Project, Valbonne, France (Dec. 2014).
(Continued)

*Primary Examiner* — Afshawn M Towfighi
(74) *Attorney, Agent, or Firm* — Leydig, Voit & Mayer, Ltd.

(57) ABSTRACT

Embodiments of the present invention provide a method for handover between secondary base stations, a network device, and user equipment. A network device instructs each of at least one candidate secondary base station to make a prior path handover preparation, so that each of the at least one candidate secondary base station waits to be selected by user equipment as a target secondary base station. The path handover preparation includes at least one of the following: preconfiguring an access resource for the user equipment or establishing a data transmission channel with the network device. The user equipment is handed over to the target secondary base station in the at least one candidate secondary base station according to configuration information of
(Continued)

each of the at least one candidate secondary base station when the user equipment needs path handover.

14 Claims, 9 Drawing Sheets

(51) Int. Cl.
| | | |
|---|---|---|
| *H04W 36/08* | (2009.01) | |
| *H04W 36/22* | (2009.01) | |
| *H04W 36/30* | (2009.01) | |
| *H04W 36/38* | (2009.01) | |
| *H04W 36/36* | (2009.01) | |

(52) U.S. Cl.
CPC .......... *H04W 36/22* (2013.01); *H04W 36/28* (2013.01); *H04W 36/30* (2013.01); *H04W 36/38* (2013.01); *H04W 36/36* (2013.01)

(56) References Cited

U.S. PATENT DOCUMENTS

| | | |
|---|---|---|
| 2014/0335869 A1 | 11/2014 | Choi et al. |
| 2015/0071250 A1 | 3/2015 | Dai et al. |
| 2015/0146692 A1 | 5/2015 | Yi et al. |
| 2016/0373975 A1 | 12/2016 | Xu et al. |
| 2017/0055187 A1 | 2/2017 | Kang et al. |

FOREIGN PATENT DOCUMENTS

| | | |
|---|---|---|
| CN | 103781136 A | 5/2014 |
| CN | 104812008 A | 7/2015 |
| EP | 2696624 A1 | 2/2014 |
| WO | 2015095708 A2 | 6/2015 |
| WO | 2016162045 A1 | 10/2016 |

OTHER PUBLICATIONS

"UE autonomous (P)SCell management," 3GPP TSG-RAN WG3 Meeting #88, Fukuoka, Japan, R3-150983, 3rd Generation Partnership Project, Valbonne, France (May 25-29, 2015).

* cited by examiner

200

A network device sends prior-preparation instruction information to each of at least one candidate secondary base station, where the prior-preparation instruction information is used to instruct each of the at least one candidate secondary base station to make a path handover preparation, and the path handover preparation includes at least one of the following: preconfiguring an access resource for user equipment UE or establishing a data transmission channel with the network device  — 210

The network device sends configuration information of each of the at least one candidate secondary base station to the UE, so that the UE is handed over to a target secondary base station in the at least one candidate secondary base station according to the configuration information of each of the at least one candidate secondary base station when the UE needs to be handed over between secondary base stations  — 220

```
User equipment UE receives configuration information of each of at
least one candidate secondary base station sent by a network device,
where each of the at least one candidate secondary base station has
made a path handover preparation, and the path handover
preparation includes at least one of the following: preconfiguring a
random access resource for the UE or establishing a data
transmission channel with the network device
```
— 310

```
The UE is handed over to a target secondary base station in the at
least one candidate secondary base station according to the
configuration information of each of the at least one candidate
secondary base station when the UE needs to be handed over
between secondary base stations
```
— 320

```
A secondary base station receives prior-preparation instruction information
sent by a network device, where the prior-preparation instruction
information is used to instruct the secondary base station to make a path
handover preparation, and the path handover preparation includes at least
one of the following: preconfiguring a random access resource for user
equipment UE or establishing a data transmission channel corresponding
to the UE with the network device
```
— 410

```
Make the path handover preparation according to the prior-preparation
instruction information
```
— 420

FIG. 4

METHOD FOR HANDOVER BETWEEN SECONDARY BASE STATIONS, NETWORK DEVICE, AND USER EQUIPMENT

CROSS-REFERENCE TO RELATED APPLICATIONS

This application is a continuation of International Application No. PCT/CN2015/086057, filed on Aug. 4, 2015, the disclosure of which is hereby incorporated by reference in its entirety.

TECHNICAL FIELD

Embodiments of the present invention relate to the communications field, and more specifically, to a method for handover between secondary base stations, a network device, and user equipment.

BACKGROUND

As mobile services increase exponentially, mobile networks are evolving toward 5G networks. Larger bandwidth and higher spectral efficiency are required in a 5G network, so as to support the explosive growth of services. Using an ultra dense small-cell network with low power can effectively provide a larger data volume. At present, a multi-connection technology involving a conventional network (for example, a Long Term Evolution LTE network) and a 5G network has been proposed in the industry. The conventional network provides network coverage to increase mobility robustness, and the 5G network provides a higher transmission rate to increase a system capacity. However, as a coverage area of a cell decreases, user equipment (UE) is handed over more frequently between cells or between eNodeBs that serve cells. As a result, mobility of the user equipment between multiple cells seriously deteriorates.

Therefore, a method for handover between secondary eNodeBs is urgently needed, to relieve the problem of mobility deterioration resulting from frequent handover between cells because cell coverage of a secondary eNodeB in a 5G network is excessively small.

SUMMARY

Embodiments of the present invention provide a method for handover between secondary base stations, a network device, and user equipment.

According to a first aspect, a method for handover between secondary base stations is provided, including: sending, by a network device, a prior-preparation instruction to each of at least one candidate secondary base station, where the prior-preparation instruction is used to instruct each of the at least one candidate secondary base station to make a path handover preparation, so that each of the at least one candidate secondary base station waits to be selected by user equipment UE as a target secondary base station, and the path handover preparation includes at least one of the following: preconfiguring an access resource for the UE or establishing a data transmission channel with the network device; and sending, by the network device, configuration information of each of the at least one candidate secondary base station to the UE, so that the UE is handed over to the target secondary base station in the at least one candidate secondary base station according to the configuration information of each of the at least one candidate secondary base station when the UE needs to be handed over between secondary base stations.

With reference to the first aspect, in a first possible implementation of the first aspect, the configuration information of each of the at least one candidate secondary base station includes at least one of the following: information about the access resource preconfigured by each candidate secondary base station for the UE or uplink grant information preconfigured by each candidate secondary base station for the UE.

With reference to the first aspect or the first possible implementation of the first aspect, in a second possible implementation of the first aspect, the method further includes: sending a first indication message to the UE, where the first indication message is used to indicate a handover trigger condition for handover of the UE, and the handover trigger condition includes at least one of the following conditions: signal quality of a secondary base station that the UE currently accesses is lower than a first threshold; signal quality of a first candidate secondary base station in the at least one candidate secondary base station is higher than a second threshold; load of a secondary base station that the UE currently accesses is higher than a third threshold; or signal quality of a second candidate secondary base station in the at least one candidate secondary base station is lower than a fourth threshold.

With reference to any one of the first aspect, or the first or the second possible implementation of the first aspect, in a third possible implementation of the first aspect, before the sending configuration information of each of the at least one candidate secondary base station to the UE, the method further includes: determining priority information of each of the at least one candidate secondary base station according to current state information of each of the at least one candidate secondary base station; and sending the priority information of each of the at least one candidate secondary base station to the UE, so that the UE is preferably handed over to the target secondary base station in the at least one candidate secondary base station according to the priority information of each of the at least one candidate secondary base station.

With reference to any one of the first aspect, or the first to the third possible implementations of the first aspect, in a fourth possible implementation of the first aspect, the method further includes: determining completion of an access process between the UE and the target secondary base station; and sending data to the target secondary base station, so that data transmission is performed between the UE and the secondary base station.

With reference to the fourth possible implementation of the first aspect, in a fifth possible implementation of the first aspect, the determining completion of an access process between the UE and the fourth secondary base station includes: receiving a second indication message sent by the UE, where the second indication message is used to indicate that the UE has successfully accessed the target secondary base station; and/or receiving a third indication message sent by the target secondary base station, where the third indication message is used to indicate that the UE has successfully accessed the target secondary base station.

With reference to any one of the first aspect, or the first to the sixth possible implementations of the first aspect, in a seventh possible implementation of the first aspect, the network device is a small-cell controller, and before the sending configuration information of each of the at least one candidate secondary base station to the UE, the method further includes: receiving a measurement report sent of the UE by a master base station, where the measurement report includes results of measurement performed by the UE on multiple secondary base stations; and determining the at least one candidate secondary base station from the multiple secondary base stations according to the measurement report.

According to a second aspect, a method for handover between secondary base stations is provided, including: receiving, by user equipment UE, configuration information of each of at least one candidate secondary base station sent by a network device, where each of the at least one candidate secondary base station has made a path handover preparation and is waiting to be selected by the UE as a target secondary base station, and the path handover preparation includes at least one of the following: preconfiguring an access resource for the UE or establishing a data transmission channel with the network device; and handing over the UE to the target secondary base station in the at least one candidate secondary base station according to the configuration information of each of the at least one candidate secondary base station when the UE needs to be handed over between secondary base stations.

With reference to the second aspect, in a first possible implementation of the second aspect, the configuration information of each of the at least one candidate secondary base station includes at least one of the following: information about the access resource preconfigured by each candidate secondary base station for the UE or uplink grant information preconfigured by each candidate secondary base station for the UE.

With reference to the second aspect or the first possible implementation of the second aspect, in a second possible implementation of the second aspect, the method further includes: receiving a first indication message sent by the network device, and determining, according to the first indication message, that the UE needs to be handed over between secondary base stations, where the first indication message is used to indicate a handover trigger condition for handover of the UE, and the trigger condition includes at least one of the following conditions: signal quality of a secondary base station that the UE currently accesses is lower than a first threshold; signal quality of a first candidate secondary base station in the at least one candidate secondary base station is higher than a second threshold; load of a secondary base station that the UE currently accesses is higher than a third threshold; or load of a second candidate secondary base station in the at least one candidate secondary base station is lower than a fourth threshold.

With reference to the second possible implementation of the second aspect, in a third possible implementation of the second aspect, the handing over the UE to the target secondary base station in the at least one candidate secondary base station according to the configuration information of each of the at least one candidate secondary base station when the UE needs to be handed over between secondary base stations includes: receiving a second indication message sent by the network device, where the second indication message carries priority information of each of the at least one candidate secondary base station; determining the target secondary base station according to the priority information of each of the at least one candidate secondary base station; and handing over the UE to the target secondary base station according to the second indication message and configuration information of the target secondary base station.

With reference to the second aspect or the first possible implementation of the second aspect, in a fourth possible implementation of the second aspect, after the receiving, by UE, configuration information of each of at least one candidate secondary base station sent by a network device, the method further includes: sending a measurement report of the UE to the network device, where the measurement report is used by the network device to determine the target secondary base station according to the measurement report; and receiving a third indication message sent by the network device, and determining, according to the third indication message, that the UE needs to be handed over between secondary base stations, where the third indication message is used to instruct the UE to be handed over to the target secondary base station.

With reference to any one of the second aspect, or the first to the fourth possible implementations of the second aspect, in a fifth possible implementation of the second aspect, the method further includes: sending a fourth indication message to the network device after the UE accesses the target secondary base station, where the fourth indication message is used to indicate that the UE has successfully accessed the target secondary base station.

According to a third aspect, a method for handover between secondary base stations is provided, including: receiving, by a secondary base station, prior-preparation instruction information sent by a network device, where the prior-preparation instruction information is used to instruct the secondary base station to make a path handover preparation, and the path handover preparation includes at least one of the following: preconfiguring an access resource for user equipment UE or establishing a data transmission channel corresponding to the UE with the network device; and making the path handover preparation according to the prior-preparation instruction information, and waiting for the UE to be handed over to the secondary base station.

With reference to the third aspect, in a first possible implementation of the third aspect, the method further includes: sending a prior-preparation completion message to the network device, where the prior-preparation completion message carries at least one of the following information: information about the access resource preconfigured by the secondary base station for the UE or a General Packet Radio System Tunneling Protocol tunnel endpoint identifier GTP TEID allocated by the secondary base station to the UE.

With reference to the first possible implementation of the third aspect, in a second possible implementation of the third aspect, the method further includes: sending, by the secondary base station, indication information to the network device when the UE successfully accesses the secondary base station, where the indication information is used to indicate that the UE has successfully accessed the secondary base station.

According to a fourth aspect, a network device is provided, including: a determining unit, where the determining unit is configured to determine to send prior-preparation instruction information to each of at least one candidate secondary base station, where the prior-preparation instruction information is used to instruct each of the at least one candidate secondary base station to make a path handover preparation, so that each of the at least one candidate secondary base station waits to be selected by user equipment UE as a target secondary base station, and the path handover preparation includes at least one of the following: preconfiguring an access resource for the UE or establishing a data transmission channel with the network device; and a sending unit, where the sending unit is configured to send the prior-preparation instruction information to each of the at least one candidate secondary base station, where the prior-preparation instruction information is used to instruct each of the at least one candidate secondary base station to make the path handover preparation, so that each of the at least one candidate secondary base station waits to be selected by the UE as the target secondary base station, and the path handover preparation includes at least one of the following: preconfiguring an access resource for the UE or establishing a data transmission channel with the network device, where the sending unit is further configured to send configuration information of each of the at least one candidate secondary base station to the UE, so that the UE is handed over to the target secondary base station in the at least one candidate secondary base station according to the configuration information of each of the at least one candidate secondary base station when the UE needs to be handed over between secondary base stations.

With reference to the fourth aspect, in a first possible implementation of the fourth aspect, the configuration information of each of the at least one candidate secondary base station includes at least one of the following: information about the access resource preconfigured by each candidate secondary base station for the UE or uplink grant information preconfigured by each candidate secondary base station for the UE.

With reference to the fourth aspect or the first possible implementation of the fourth aspect, in a second possible implementation of the fourth aspect, the sending unit is further configured to send a first indication message to the UE, where the first indication message is used to indicate a handover trigger condition for handover of the UE, and the handover trigger condition includes at least one of the following conditions: signal quality of a secondary base station that the UE currently accesses is lower than a first threshold; signal quality of a first candidate secondary base station in the at least one candidate secondary base station is higher than a second threshold; load of a secondary base station that the UE currently accesses is higher than a third threshold; or signal quality of a second candidate secondary base station in the at least one candidate secondary base station is lower than a fourth threshold.

With reference to any one of the fourth aspect, or the first or the second possible implementation of the fourth aspect, in a third possible implementation of the fourth aspect, the determining unit is further configured to determine priority information of each of the at least one candidate secondary base station according to current state information of each of the at least one candidate secondary base station; and the sending unit is further configured to send the priority information of each of the at least one candidate secondary base station to the UE, so that the UE is preferably handed over to the target secondary base station in the at least one candidate secondary base station according to the priority information of each of the at least one candidate secondary base station.

With reference to any one of the fourth aspect, or the first to the third possible implementations of the fourth aspect, in a fourth possible implementation of the fourth aspect, the determining unit is further configured to determine completion of an access process between the UE and the target secondary base station; and the sending unit is further configured to send data to the target secondary base station, so that data transmission is performed between the UE and the secondary base station.

With reference to the fourth possible implementation of the fourth aspect, in a fifth possible implementation of the fourth aspect, the network device further includes: a first receiving unit, where the first receiving unit is configured to receive a second indication message sent by the UE, where the second indication message is used to indicate that the UE has successfully accessed the target secondary base station; and/or the second receiving unit is configured to receive a third indication message sent by the target secondary base station, where the third indication message is used to indicate that the UE has successfully accessed the target secondary base station.

With reference to any one of the fourth aspect, or the first to the fifth possible implementations of the fourth aspect, in a sixth possible implementation of the fourth aspect, the network device is a small-cell controller, and the network device further includes: a second receiving unit, where the second receiving unit is configured to receive a measurement report of the UE sent by a master base station, where the measurement report includes results of measurement performed by the UE on multiple secondary base stations; and the determining unit is further configured to determine the at least one candidate secondary base station from the multiple secondary base stations according to the measurement report.

According to a fifth aspect, user equipment is provided, including: a receiving unit, where the receiving unit is configured to receive configuration information of each of at least one candidate secondary base station sent by a network device, where each of the at least one candidate secondary base station has made a path handover preparation and is waiting to be selected by the UE as a target secondary base station, and the path handover preparation includes at least one of the following: preconfiguring an access resource for the UE or establishing a data transmission channel with the network device; and a handover unit, where the handover unit is configured to hand over the UE to the target secondary base station in the at least one candidate secondary base station according to the configuration information of each of the at least one candidate secondary base station when the UE needs to be handed over between secondary base stations.

With reference to the fifth aspect, in a first possible implementation of the fifth aspect, the configuration information of each of the at least one candidate secondary base station includes at least one of the following: information about the access resource preconfigured by each candidate secondary base station for the UE or uplink grant information preconfigured by each candidate secondary base station for the UE.

With reference to the fifth aspect or the first possible implementation of the fifth aspect, in a second possible implementation of the fifth aspect, the receiving unit is further configured to: receive a first indication message sent by the network device, and determine, according to the first indication message, that the UE needs to be handed over between secondary base stations, where the first indication message is used to indicate a handover trigger condition for handover of the UE, and the trigger condition includes at least one of the following conditions: signal quality of a secondary base station that the UE currently accesses is lower than a first threshold; signal quality of a first candidate secondary base station in the at least one candidate secondary base station is higher than a second threshold; load of a secondary base station that the UE currently accesses is higher than a third threshold; or load of a second candidate secondary base station in the at least one candidate secondary base station is lower than a fourth threshold.

With reference to the second possible implementation of the fifth aspect, in a third possible implementation of the fifth aspect, the unit is specifically configured to: receive a second indication message sent by the network device, where the second indication message carries priority information of each of the at least one candidate secondary base station; and determine the target secondary base station according to the priority information of each of the at least one candidate secondary base station; and the handover unit is specifically configured to hand over the UE to the target secondary base station according to the second indication message and configuration information of the target secondary base station.

With reference to the fifth aspect or the first possible implementation of the fifth aspect, in a fourth possible implementation of the fifth aspect, the device further includes: a sending unit, where the sending unit is configured to send a measurement report of the UE to the network device, where the measurement report is used by the network device to determine the target secondary base station according to the measurement report; and the receiving unit is further configured to: receive a third indication message sent by the network device, and determine, according to the third indication message, that the UE needs to be handed over between secondary base stations, where the third indication message is used to instruct the UE to be handed over to the target secondary base station.

With reference to any one of the fifth aspect, or the first to the third possible implementations of the fifth aspect, in a fifth possible implementation of the fifth aspect, the device further includes: a sending unit, where the sending unit is configured to send a fourth indication message to the network device after the UE accesses the target secondary base station, where the fourth indication message is used to indicate that the UE has successfully accessed the target secondary base station.

According to a sixth aspect, a network device is provided, including: a receiving unit, where the receiving unit is configured to receive prior-preparation instruction information sent by a first network device, where the prior-preparation instruction information is used to instruct the network device to make a path handover preparation, and the path handover preparation includes at least one of the following: preconfiguring an access resource for user equipment UE or establishing a data transmission channel corresponding to the UE with the first network device; and a handover unit, configured to: make the path handover preparation according to the prior-preparation instruction information, and wait for the UE to be handed over to the secondary base station.

With reference to the sixth aspect, in a first possible implementation of the sixth aspect, the device further includes: a sending units, where the sending unit sends a prior-preparation completion message to the first network device, where the prior-preparation completion message carries at least one of the following information: information about the access resource preconfigured by the network device for the UE or a General Packet Radio System Tunneling Protocol tunnel endpoint identifier (GTP TEID) allocated by the network device to the UE.

With reference to the first possible implementation of the sixth aspect, in a second possible implementation of the sixth aspect, the sending unit is further configured to send indication information to the first network device when the UE successfully accesses the network device, where the indication information is used to indicate that the UE has successfully accessed the network device.

Based on the foregoing technical solutions, according to the method for handover between secondary base stations, the network device, and the user equipment that are provided in the embodiments of the present invention, the network device instructs each of the at least one candidate secondary base station to make the prior path handover preparation, so that the user equipment is handed over according to the configuration information of each of the at least one candidate secondary base station when the user equipment needs path handover. Therefore, the embodiments of the present invention can relieve a problem of mobility deterioration resulting from frequent handover between cells because cell coverage of a secondary base station in a network is excessively small.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 2 is a schematic flowchart of a method for handover between secondary base stations according to an embodiment of the present invention;

FIG. 3 is a schematic flowchart of a method for handover between secondary base stations according to another embodiment of the present invention;

FIG. 4 is a schematic flowchart of a method for handover between secondary base stations according to another embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that user equipment (UE) may be referred to as a mobile terminal (Mobile Terminal), a mobile user device, and the like. The user equipment may communicate with one or more core networks by using a radio access network (RAN). The user equipment may be a mobile terminal such as a mobile phone (also referred to as a "cellular" phone) or a computer with a mobile terminal. For example, the user equipment may be a portable, pocket-sized, handheld, computer built-in, or in-vehicle mobile apparatus, which exchanges voice and/or data with the radio access network.

It should be understood that a base station may be an evolved NodeB (eNB or e-NodeB, evolutional Node B) in a Long Term Evolution (LTE) system, or may be a radio network controller (RNC) in a Universal Mobile Telecommunications System (UMTS), or the like; or the base station may be a new base station in a 5G system. This is not limited in the present invention.

Figure 1A:
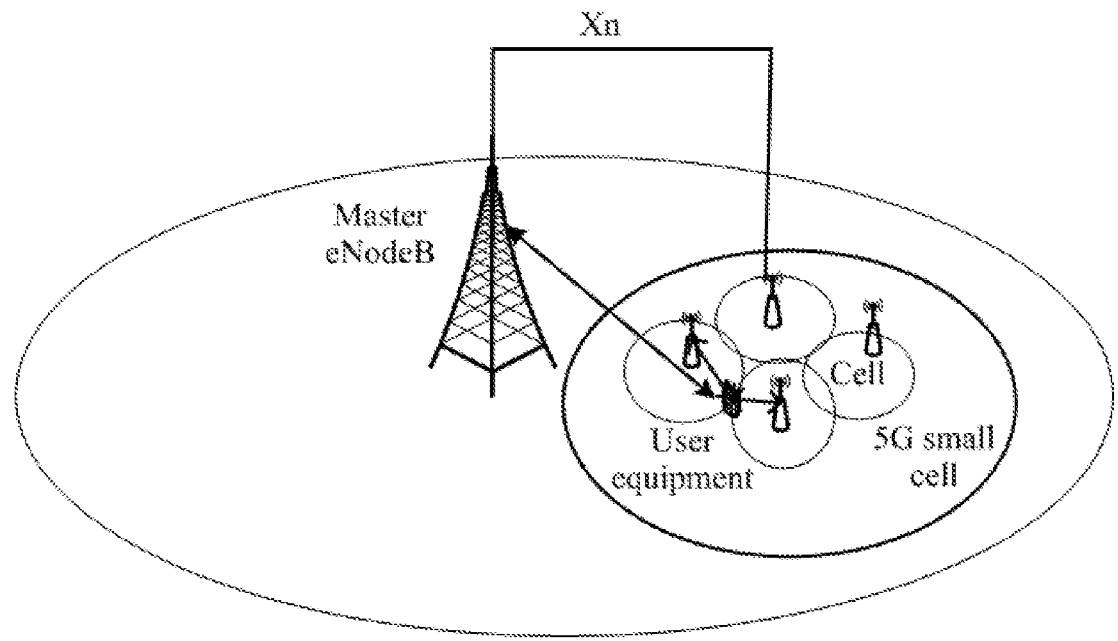
FIG. 1A is a schematic architecture diagram of an application scenario according to an embodiment of the present invention.
Figure 1B:
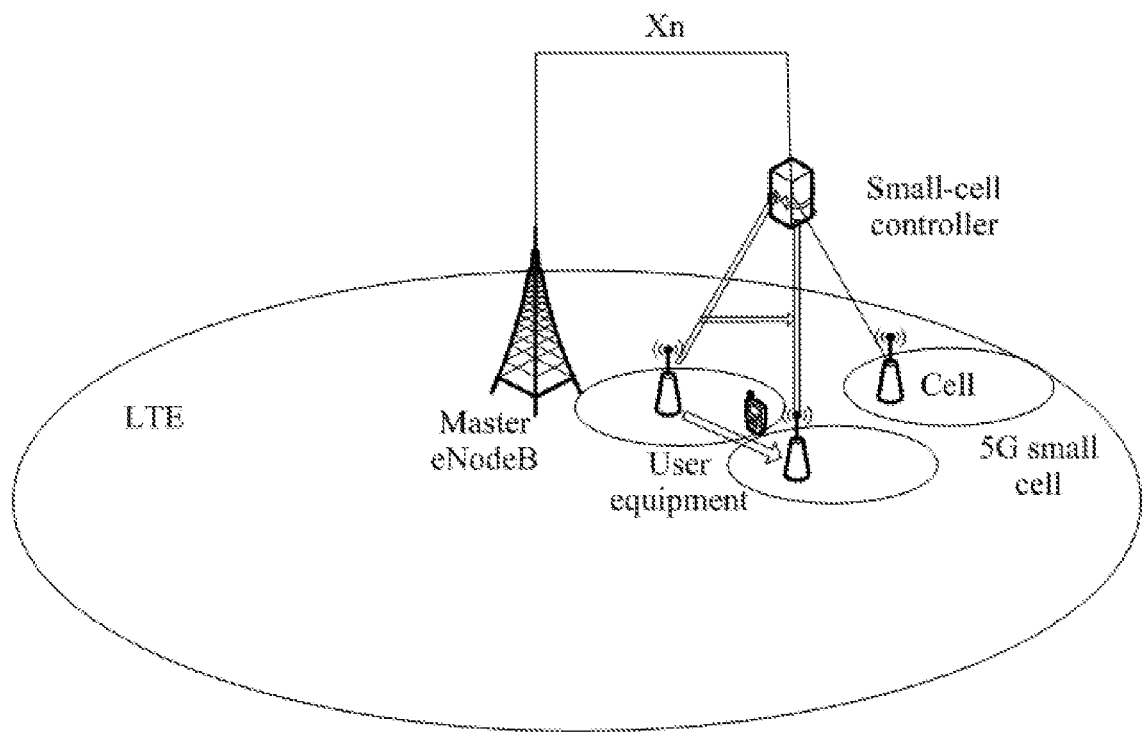
FIG. 1B is a schematic architecture diagram of an application scenario according to another embodiment of the present invention.

FIG. 1A and FIG. 1B are schematic architecture diagrams of application scenarios according to the embodiments of the present invention.

As shown in FIG. 1A, this system architecture uses a multi-connection technology involving an LTE system and a 5G new system. A macro base station in the LTE system serves as a master eNodeB (MeNB) to provide coverage and mobility, and cells in the 5G new system serve as secondary eNodeBs (SeNB) to increase a system capacity. The macro base station is connected to a small cell in the 5G new system by using an Xn interface. In the network architecture, a user plane protocol stack includes a Packet Data Convergence Protocol (PDCP) layer, a Radio Link Control (RLC) layer, and a Media Access Control (MAC) layer. The PDCP layer on the user plane is located in the master eNodeB and a PDCP protocol data unit (PDCP PDU) is transferred between the PDCP layer and the secondary eNodeB by using the Xn interface.

As shown in FIG. 1B, this system architecture also uses a multi-connection technology involving an LTE system and a 5G new system. Cells in the 5G new system are managed together by a small-cell controller, and an LTE macro base station serves as a master eNodeB and is connected to the small-cell controller by using an Xn interface. In the network architecture, a user plane protocol stack includes a PDCP layer, an RLC layer, and a MAC layer. The master eNodeB communicates with the small-cell controller by using the Xn interface. The PDCP layer may be located in the small-cell controller. For example, the master eNodeB sends a data packet to the small-cell controller, and after the PDCP layer of the small-cell controller processes the data packet, the small-cell controller sends a PDCP PDU to a 5G new small cell.

It should be understood that, a scenario of a multi-connection technology applied to an LTE system and a 5G new system is used as an example for description in the embodiments of the present invention, but the present invention is not limited thereto. In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists.

In addition, the character "/" in this specification generally indicates an "or" relationship between the associated objects.

FIG. 2 shows a schematic flowchart of a method for handover between secondary base stations according to an embodiment of the present invention. A network device that executes the method 200 may be a macro base station serving as a master base station, or may be a small-cell controller used to manage 5G small cells together. As shown in FIG. 2, the method 200 includes the following steps:

210. The network device sends prior-preparation instruction information to each of at least one candidate secondary base station, where the prior-preparation instruction information is used to instruct each of the at least one candidate secondary base station to make a path handover preparation, and the path handover preparation includes at least one of the following: preconfiguring an access resource for user equipment UE or establishing a data transmission channel with the network device.

220. The network device sends configuration information of each of the at least one candidate secondary base station to the UE, so that the UE is handed over to a target secondary base station in the at least one candidate secondary base station according to the configuration information of each of the at least one candidate secondary base station when the UE needs to be handed over between secondary base stations.

In step 210, the network device sends the prior-preparation instruction information to the at least one candidate secondary base station within a coverage area of the network device. The prior-preparation instruction information may be carried in an adding request message or may be carried in another request message. The at least one candidate secondary base station may form a candidate base station cluster. This is not limited in the present invention.

Specifically, the prior-preparation instruction information is used to instruct each candidate secondary base station receiving the information to prepare in advance for communication with the UE, so that each of the at least one candidate secondary base station waits to be selected as the target secondary base station by the UE, or each of the at least one candidate secondary base station has prepared for handover when the UE has a handover requirement.

Specifically, the path handover preparation made by a candidate secondary base station receiving the prior-preparation instruction information includes: pre-allocating and reserving a resource for the UE, so that the UE is actively handed over quickly to the candidate secondary base station, for example, allocating a random access parameter preamble, reserving the resource for the UE for a time period (for example, one minute), and waiting for access of the UE. When a UE handover condition is satisfied, the UE is actively handed over to a condition-satisfying candidate secondary base station in the at least one candidate secondary base station and the network device no longer needs to trigger a path handover preparation procedure. In this way, a latency for secondary base station change of the UE is reduced. In addition, to complete subsequent data path handover for the UE, a data channel, for example, a General Packet Radio System Tunneling Protocol User Plane (GPRS Tunnelling Protocol User Plane or GTP-U) data channel, needs to be established between the network device and the secondary base station. That is, both the network device and the secondary base station allocate respective General Packet Radio System Tunneling Protocol tunnel endpoint identifiers (GPRS Tunnelling Protocol User Tunelling Identity or GTP TEID) to the data channel, and send the identifiers to the other party. When the UE handover condition is satisfied and the UE is actively handed over to the candidate secondary base station, the UE can quickly complete path handover between the network device and the secondary base station by using the data channel that has been established in advance.

Specifically, in step 220, when the network device is a master base station, the master base station directly sends the configuration information of each of the at least one candidate secondary base station to the UE, so that the UE is handed over according to configuration information of the target secondary base station in the at least one candidate secondary base station; when the network device is a small-cell controller, the small-cell controller may send the configuration information of each of the at least one candidate secondary base station to the UE by using the master base station. After using a candidate base station of the at least one candidate secondary base station as the target secondary base station, the UE accesses the target secondary base station according to information about a handover preparation that has been made by each candidate secondary base station. For example, the UE accesses the target secondary base station by using the preconfigured access resource. It should be understood that the configuration information of each of the at least one candidate secondary base station may be carried in a Radio Resource Control (RRC) connection reconfiguration message of each secondary base station or may be carried in another request message. The present invention is not limited thereto.

Specifically, in step 220, that the UE needs handover means that at least one of the following actions is satisfied: The UE receives a handover command of the master base station, a handover trigger condition configured by the UE is satisfied, or a handover trigger condition delivered by the master base station to the UE is satisfied. It should be understood that, a condition that the UE needs handover may be any condition able to instruct the UE to be handed over between secondary base stations. The present invention is not limited thereto.

It should be understood that the target secondary base station in the at least one candidate secondary base station may be any of the at least one candidate secondary base station. The UE may select the target secondary base station actively or select the target secondary base station according to the instruction of the network device, and is handed over to the target secondary base station.

It should also be understood that the foregoing action of handover between secondary base stations may be an initial access action when the UE accesses a cell for the first time, or may be an action of handover of the UE between cells covered by the master base station.

Based on the foregoing technical solution, according to the method for handover between secondary base stations, the network device, and the user equipment that are provided in this embodiment of the present invention, the network device instructs each of the at least one candidate secondary base station to make the prior path handover preparation, so that the user equipment is handed over according to the configuration information of each of the at least one candidate secondary base station when the user equipment needs path handover. Therefore, this embodiment of the present invention can relieve a problem of mobility deterioration resulting from frequent handover between cells because cell coverage of a secondary base station in a network is excessively small.

Optionally, in an embodiment of the present invention, the configuration information of each of the at least one candidate secondary base station includes at least one of the following: information about the access resource preconfigured by each candidate secondary base station for the UE or uplink grant information preconfigured by each candidate secondary base station for the UE.

Optionally, in an embodiment of the present invention, the configuration information of each of the at least one candidate secondary base station may further include at least one of the following: identification information of each candidate secondary base station or a UE identifier allocated by each candidate secondary base station to the UE.

Specifically, when the UE needs to access the target secondary base station, the UE needs to access the target secondary base station according to at least one of the following information: identification information of the target secondary base station, a UE identifier allocated by the target secondary base station to the UE, information about the access resource preconfigured by the target secondary base station for the UE, uplink grant information preconfigured by the target secondary base station for the UE, or the like. It should be understood that other information used by the UE to access the target secondary base station also falls within the protection scope of this embodiment of the present invention. The present invention is not limited thereto. Therefore, when the UE needs to be handed over between secondary base stations, the UE may be directly handed over to the target secondary base station in the at least one candidate secondary base station according to the configuration information.

Optionally, in an embodiment of the present invention, the method further includes: sending a first indication message to the UE, where the first indication message is used to indicate a handover trigger condition for handover of the UE, and the handover trigger condition includes at least one of the following conditions: signal quality of a secondary base station that the UE currently accesses is lower than a first threshold, signal quality of a first candidate secondary base station in the at least one candidate secondary base station is higher than a second threshold, load of a secondary base station that the UE currently accesses is higher than a third threshold, or signal quality of a second candidate secondary base station in the at least one candidate secondary base station is lower than a fourth threshold.

Specifically, the network device delivers the handover trigger condition to the UE, and the UE determines, according to the trigger condition, whether handover between secondary base stations is required. The handover trigger condition is that, for example, in the at least one candidate secondary base station that has made the path handover preparation, there exists a candidate secondary base station whose signal quality is higher than a specific threshold, and signal quality of a secondary base station that the UE currently accesses is lower than a specific threshold; or for another example, in the at least one candidate secondary base station that has made the path handover preparation, there exists a candidate secondary base station whose load is lower than a specific threshold, and load of a secondary base station that the UE currently accesses is higher than a specific threshold.

It should be understood that both the first candidate secondary base station and the second candidate secondary base station are any of the at least one candidate secondary base station. The first candidate secondary base station and the second candidate secondary base station may be the same or may be different. It should also be understood that the handover trigger condition may be carried in the RRC connection reconfiguration message or may be carried in another possible message. The present invention is not limited thereto.

Optionally, in an embodiment of the present invention, before the sending configuration information of each of the at least one candidate secondary base station to the UE, the method further includes: determining priority information of each of the at least one candidate secondary base station according to current state information of each of the at least one candidate secondary base station; and sending the priority information of each of the at least one candidate secondary base station, so that the UE is preferably handed over to the target secondary base station in the at least one candidate secondary base station according to the priority information of each of the at least one candidate secondary base station.

Specifically, the current state information of each candidate secondary base station includes power information, a load status, or the like of each candidate secondary base station. The present invention is not limited thereto. The network device may determine, according to information reported by the UE such as a measurement report, the target secondary base station that the UE preferably accesses, and send, to the UE, instruction information instructing the UE to preferably access the target secondary base station, so that the UE preferably accesses the target secondary base station according to the instruction information. Alternatively, the network device may determine a priority of each candidate secondary base station according to a measurement report and a load status of each candidate secondary base station that are reported by the UE, and send the priority information to the UE, so that the UE determines, according to the priority information, the target secondary base station that the UE first accesses. For example, the network device may explicitly indicate, by using a name of an information element in a sent message, the target secondary base station that the UE first accesses, or may implicitly indicate, to the UE, a priority of the at least one candidate secondary base station, so that the UE determines the target secondary base station. It should be understood that any method that can be used to inform the UE of the priority information of the at least one candidate secondary base station may be implemented. The present invention is not limited thereto.

Optionally, in an embodiment of the present invention, after the sending configuration information of each of the at least one candidate secondary base station to the UE, the method further includes: receiving a first measurement report sent by the UE; determining the target secondary base station from the at least one candidate secondary base station according to the first measurement report; and sending fourth indication information to the UE, where the fourth indication information is used to indicate that the UE is handed over to the target secondary base station.

Specifically, the network device determines, according to the information sent by the UE such as the measurement report, whether to activate a new secondary base station, that is, the target secondary base station. If the target secondary base station is determined to be activated, an activation command is delivered to the UE. The activation command includes an identifier of the target secondary base station to be activated, and may also include a command for deactivating an original secondary base station. After receiving the activation command, the UE may trigger a synchronization and access procedure to access the target secondary base station. It should be understood that the UE may alternatively complete, in advance, a procedure for accessing each candidate secondary cell, and the UE directly sends uplink data to the new target secondary base station after receiving the activation command. It should also be understood that the network device may dynamically determine the target secondary base station according to the information sent by the UE such as the measurement report, and instruct the UE to be handed over to the target secondary base station that is most newly determined.

Optionally, in an embodiment of the present invention, the method further includes: determining completion of an access process between the UE and the target secondary base station; and sending data to the target secondary base station, so that data transmission is performed between the UE and the secondary base station.

Specifically, after determining that the UE has successfully accessed the target secondary base station, the network device delivers, to the target secondary base station, data that is required by the UE subsequently and/or data that has not been transmitted successfully to the secondary base station that the UE had originally accessed, so that the UE obtains subsequent data from the target secondary base station.

Optionally, in an embodiment of the present invention, the determining completion of an access process between the UE and the fourth secondary base station includes: receiving a second indication message sent by the UE, where the second indication message is used to indicate that the UE has successfully accessed the target secondary base station; and/or receiving a third indication message sent by the target secondary base station, where the third indication message is used to indicate that the UE has successfully accessed the target secondary base station.

Specifically, when the network device is a master base station, one possible implementation is: After successfully accessing the target secondary base station, the UE sends an indication message to the master base station. The indication message may be a PDCP state report to which information about successful access to the target secondary base station is added, or may be another message to which information about successful access to the target secondary base station is added. The present invention is not limited thereto. After receiving the message, the master base station determines that the UE has successfully accessed the target secondary base station, and delivers, to the target secondary base station, subsequent new data and/or data that has not been transmitted successfully to the secondary base station that the UE had originally accessed. Another possible implementation is: After the UE successfully accesses the target secondary base station, the target secondary base station sends an indication message to the master base station, where the indication message includes indication information that the UE has successfully accessed the target secondary base station. It should be understood that the indication information may be carried in a data frame, for example, may be carried in a data frame of a GTP-U extension header. The present invention is not limited thereto. After receiving the message, the master base station determines that the UE has successfully accessed the target secondary base station, and delivers, to the target secondary base station, subsequent new data and/or data that has not been transmitted successfully to the secondary base station that the UE had originally accessed.

Specifically, when the network device is a small-cell controller, after successfully accessing the target secondary base station, the UE sends an indication message to the master base station. The indication message may be a PDCP state report to which information about successful access to the target secondary base station is added, or may be another message to which information about successful access to the target secondary base station is added. The present invention is not limited thereto. After receiving the message, the master base station forwards the message to the small-cell controller. After receiving the message, the small-cell controller determines that the UE has successfully accessed the target secondary base station, and delivers, to the target secondary base station, subsequent new data and/or data that has not been transmitted successfully to the secondary base station that the UE had originally accessed. Another possible implementation is: After the UE successfully accesses the target secondary base station, the target secondary base station sends an indication message to the small-cell controller, where the indication message includes indication information that the UE has successfully accessed the target secondary base station. It should be understood that the indication information may be carried in a data frame, for example, may be carried in a data frame of a GTP-U extension header. The present invention is not limited thereto. After receiving the message, the small-cell controller determines that the UE has successfully accessed the target secondary base station, and delivers, to the target secondary base station, subsequent new data and/or data that has not been transmitted successfully to the secondary base station that the UE had originally accessed.

Specifically, the small-cell controller includes functions corresponding to a first RRC sublayer and a first PDCP sublayer. The secondary base station includes functions corresponding to a second RRC sublayer, a second PDCP sublayer, an RLC layer, a MAC layer, and a physical (PHY) layer. The first RRC sublayer and the second RRC sublayer together form an RRC layer. A function of the first RRC sublayer is global RRC configuration management. Functions of the second RRC sublayer are generating, sending, and receiving an SRB (Signalling Radio Bearers) and local RRC configuration management. A function of the first PDCP sublayer is DRB (Data Radio Bearers) processing. A function of the second PDCP sublayer is SRB processing. Alternatively, the small-cell controller includes an RRC layer and a PDCP layer, and is used to implement functions corresponding to the RRC layer and the PDCP layer. The secondary base station includes an RLC layer, a MAC layer, and a PHY layer, and is used to implement functions corresponding to the RLC layer, the MAC layer, and the PHY layer. Functions corresponding to the PDCP layer include: header compression, security, and reordering. Functions corresponding to the RLC layer include: segmentation, concatenation, and Automatic Repeat reQuest (ARQ). Functions corresponding to the MAC layer include: scheduling, logical-channel priority processing, HARQ (Hybrid Automatic Repeat ReQuest), and the like. Functions corresponding to the PHY layer include: modulation and demodulation, coding, and multi-antenna mapping. For example, after receiving data sent by the master base station, the small-cell controller implements a PDCP function for the service data to generate a PDCP PDU, performs header compression on the PDCP PDU, encrypts the PDCP PDU according to an encryption algorithm and an encryption key, adds a sequence number for the PDCP PDU, and delivers the PDCP PDU to the secondary base station, and the secondary base station implements the functions corresponding to the RLC layer, the MAC layer, and the PHY layer for the PDCP PDU.

Optionally, in an embodiment of the present invention, the network device is a small-cell controller, and before the sending configuration information of each of the at least one candidate secondary base station to the UE, the method further includes: receiving the measurement report of the UE sent by the master base station, where the measurement report includes results of measurement performed by the UE on multiple secondary base stations; and determining the at least one candidate secondary base station from the multiple secondary base stations according to the measurement report.

Specifically, when the network device is a master base station, the master base station determines, according to the measurement report reported by the UE, that the at least one candidate secondary base station may be used as a candidate secondary base station for path handover of the UE, where the measurement report reported by the UE includes information such as power of multiple secondary base stations. The master base station may determine, according to the information, the candidate secondary base station for path handover of the UE.

Specifically, when the network device is a small-cell controller, the master base station first receives the measurement report reported by the UE, where the measurement report includes the results of measurement performed by the UE on the multiple secondary base stations and/or service information of the UE. After receiving the measurement report sent by the UE, the master base station determines to add a secondary base station to offload data, and therefore sends a secondary-base-station adding request message to the small-cell controller, where the secondary-base-station adding request message includes the measurement report reported by the UE. In this case, after receiving the adding request message, the small-cell controller determines, according to the measurement report of the UE carried in the message, that the at least one candidate secondary base station may be used as a candidate secondary base station for path handover of the UE.

Based on the foregoing technical solution, according to the method for handover between secondary base stations, the network device, and the user equipment that are provided in this embodiment of the present invention, the network device instructs each of the at least one candidate secondary base station to make the prior path handover preparation, so that the user equipment is handed over according to the configuration information of each of the at least one candidate secondary base station when the user equipment needs path handover. Therefore, this embodiment of the present invention can relieve a problem of mobility deterioration resulting from frequent handover between cells because cell coverage of a secondary base station in a network is excessively small.

FIG. 3 is a schematic flowchart of a method for handover between secondary base stations according to another embodiment of the present invention. The method 300 may be executed by user equipment UE, including the following steps:

310. User equipment UE receives configuration information of each of at least one candidate secondary base station sent by a network device, where each of the at least one candidate secondary base station has made a path handover preparation, and the path handover preparation includes at least one of the following: preconfiguring an access resource for the UE or establishing a data transmission channel with the network device.

320. The UE is handed over to a target secondary base station in the at least one candidate secondary base station according to the configuration information of each of the at least one candidate secondary base station when the UE needs to be handed over between secondary base stations.

In step 320, each of the at least one candidate secondary base station has made the path handover preparation and is waiting to be selected by the UE as the target secondary base station, so that the UE can be directly handed over to the target secondary base station when the UE has a handover requirement.

Specifically, when the network device is a master base station, the UE receives a reconfiguration message sent by the master base station. The message carries the configuration information of each of the at least one candidate secondary base station, the at least one candidate secondary base station is a candidate secondary base station that the UE may access, and one of the at least one candidate secondary base station is the target secondary base station. It should be understood that the target secondary base station may be selected by the network device, and then the network device instructs the UE to be handed over to the selected target secondary base station; or the target secondary base station may be determined by the UE from the at least one candidate secondary base station. It should also be understood that the reconfiguration message may be an RRC connection reconfiguration message that carries the configuration information of each secondary base station or may be another request message that carries the configuration information of each secondary base station. The present invention is not limited thereto.

Specifically, when the network device is a small-cell controller, a master base station receives the configuration information, determined by the small-cell controller, of each of the at least one secondary base station, and sends the configuration information to the UE by using the reconfiguration message.

Based on the foregoing technical solution, according to the method for handover between secondary base stations, the network device, and the user equipment that are provided in this embodiment of the present invention, the network device instructs each of the at least one candidate secondary base station to make the prior path handover preparation, so that the user equipment is handed over according to the configuration information of each of the at least one candidate secondary base station when the user equipment needs path handover. Therefore, this embodiment of the present invention can relieve a problem of mobility deterioration resulting from frequent handover between cells because cell coverage of a secondary base station in a network is excessively small.

Optionally, in an embodiment of the present invention, the configuration information of each of the at least one candidate secondary base station includes at least one of the following: information about the access resource preconfigured by each candidate secondary base station for the UE or uplink grant information preconfigured by each candidate secondary base station for the UE.

Optionally, in an embodiment of the present invention, the configuration information of each of the at least one candidate secondary base station may further include at least one of the following: identification information of each candidate secondary base station or a UE identifier allocated by each candidate secondary base station to the UE.

Specifically, when the UE needs to access the target secondary base station, the UE needs to access the target secondary base station according to at least one of the following information: identification information of the target secondary base station, a UE identifier allocated by the target secondary base station to the UE, information about the access resource preconfigured by the target secondary base station for the UE, uplink grant information preconfigured by the target secondary base station for the UE, or the like. It should be understood that other information used by the UE to access the target secondary base station also falls within the protection scope of this embodiment of the present invention. The present invention is not limited thereto. Therefore, when the UE needs to be handed over between secondary base stations, the UE may be directly handed over to the target secondary base station in the at least one candidate secondary base station according to the configuration information.

Optionally, in an embodiment of the present invention, the method further includes: receiving a first indication message sent by the network device, and determining, according to the first indication message, that the UE needs to be handed over between secondary base stations, where the first indication message is used to indicate a handover trigger condition for handover of the UE, and the trigger condition includes at least one of the following conditions: signal quality of a secondary base station that the UE currently accesses is lower than a first threshold; signal quality of a first candidate secondary base station in the at least one candidate secondary base station is higher than a second threshold; load of a secondary base station that the UE currently accesses is higher than a third threshold; or load of a second candidate secondary base station in the at least one candidate secondary base station is lower than a fourth threshold.

Specifically, the UE receives the handover trigger condition delivered by the network device, and the UE determines, according to the trigger condition, whether handover between secondary base stations is required. The handover trigger condition is that, for example, in the at least one candidate secondary base station that has made the path handover preparation, there exists a candidate secondary base station whose signal quality is higher than a specific threshold, and signal quality of a secondary base station that the UE currently accesses is lower than a specific threshold; or for another example, in the at least one candidate secondary base station that has made the path handover preparation, there exists a candidate secondary base station whose load is lower than a specific threshold, and load of a secondary base station that the UE currently accesses is higher than a specific threshold.

It should be understood that both the first candidate secondary base station and the second candidate secondary base station are any of the at least one candidate secondary base station. The first candidate secondary base station and the second candidate secondary base station may be the same or may be different. It should also be understood that the handover trigger condition may be carried in the RRC connection reconfiguration message or may be carried in another possible message. The present invention is not limited thereto.

Optionally, in an embodiment of the present invention, the handing over the UE to a target secondary base station in the at least one candidate secondary base station according to the configuration information of each of the at least one candidate secondary base station when the UE needs to be handed over between secondary base stations includes: receiving a second indication message sent by the network device, where the second indication message carries priority information of each of the at least one candidate secondary base station; determining the target secondary base station according to the priority information of each of the at least one candidate secondary base station; and handing over the UE to the target secondary base station according to the second indication message and configuration information of the target secondary base station.

Specifically, the network device may determine, according to information reported by the UE such as a measurement report, the target secondary base station that the UE preferably accesses, and send, to the UE, instruction information instructing the UE to preferably access the target secondary base station. After receiving the instruction information, the UE preferably accesses the target secondary base station according to the instruction information. Alternatively, the network device may determine a priority of each candidate secondary base station according to a measurement report and a load status of each candidate secondary base station that are reported by the UE, and send the priority information to the UE, so that the UE determines, according to the priority information, the target secondary base station that the UE first accesses. For example, the network device may explicitly indicate, by using a name of an information element in a sent message, the target secondary base station that the UE first accesses, or may implicitly indicate, to the UE, a priority of the at least one candidate secondary base station, so that the UE determines the target secondary base station. It should be understood that any method that can be used to inform the UE of the priority information of the at least one candidate secondary base station may be implemented. The present invention is not limited thereto.

Optionally, in an embodiment of the present invention, after the receiving, by UE, configuration information of each of at least one candidate secondary base station sent by a network device, the method further includes: sending a measurement report of the UE to the network device, where the measurement report is used by the network device to determine the target secondary base station; and receiving a third indication message sent by the network device, and determining, according to the third indication message, that the UE needs to be handed over between secondary base stations, where the third indication message is used to instruct the UE to be handed over to the target secondary base station.

Specifically, the network device determines, according to the information sent by the UE such as the measurement report, whether to activate a new secondary base station, that is, the target secondary base station. If the target secondary base station is determined to be activated, an activation command is delivered to the UE. The activation command includes an identifier of the target secondary base station to be activated, and may also include a command for deactivating an original secondary base station. After receiving the activation command, the UE determines that the UE needs to be handed over between secondary base stations, and the UE triggers a synchronization and access procedure to access the target secondary base station. It should be understood that the UE may alternatively complete, in advance, a procedure for accessing each candidate secondary cell, and the UE directly sends uplink data to the new target secondary base station after receiving the activation command. It should also be understood that the network device may dynamically determine the target secondary base station according to the information sent by the UE such as the measurement report, and instruct the UE to be handed over to the target secondary base station that is most newly determined.

Optionally, in an embodiment of the present invention, the method further includes: sending a fourth indication message to the network device after the UE accesses the target secondary base station, where the fourth indication message is use to indicate that the UE has successfully accessed the target secondary base station.

Specifically, when the network device is a master base station, one possible implementation is: After successfully accessing the target secondary base station, the UE sends an indication message to the master base station. The indication message may be a PDCP state report to which information about successful access to the target secondary base station is added, or may be another message to which information about successful access to the target secondary base station is added. The present invention is not limited thereto. When the network device is a small-cell controller, the master base station forwards the received indication message to the small-cell controller.

Based on the foregoing technical solution, according to the method for handover between secondary base stations, the network device, and the user equipment that are provided in this embodiment of the present invention, the network device instructs each of the at least one candidate secondary base station to make the prior path handover preparation, so that the user equipment is handed over according to the configuration information of each of the at least one candidate secondary base station when the user equipment needs path handover. Therefore, this embodiment of the present invention can relieve a problem of mobility deterioration resulting from frequent handover between cells because cell coverage of a secondary base station in a network is excessively small.

FIG. 4 is a method for handover between secondary base stations according to an embodiment of the present invention. The method may be executed by a 5G small cell. As shown in FIG. 4, the method 400 includes the following steps:

410. A secondary base station receives prior-preparation instruction information sent by a network device, where the prior-preparation instruction information is used to instruct the secondary base station to make a path handover preparation, and the path handover preparation includes at least one of the following: preconfiguring an access resource for user equipment UE or establishing a data transmission channel corresponding to the UE with the network device.

420. Make the path handover preparation according to the prior-preparation instruction information.

In step 410, after receiving the prior-preparation instruction information, the secondary base station preconfigures the access resource for the UE, establishes the data transmission channel corresponding to the UE with the network device, and waits for the UE to be handed over to the secondary base station, so that when the UE has a handover requirement, the UE can be directly handed over to the secondary base station without making a path handover preparation. This can reduce a time required for handover.

Specifically, the secondary base station prepares in advance for communication with the UE. The path handover preparation made by a candidate secondary base station receiving the prior-preparation instruction information includes: allocating a resource before the UE establishes an access connection, for example, allocating a random access parameter preamble and a cell temporary identifier of the UE, reserving the resource for the UE for a time period (for example, one minute), and waiting for access of the UE. In addition, to complete subsequent data path handover for the UE, a data channel, for example, a GTP-U data channel, needs to be established between the network device and the secondary base station. That is, both the network device and the secondary base station allocate respective GTP TEIDs to the data channel, and send the GTP TEIDs to the other party.

Based on the foregoing technical solution, according to the method for handover between secondary base stations, the network device, and the user equipment that are provided in this embodiment of the present invention, the network device instructs each of the at least one candidate secondary base station to make the prior path handover preparation, so that the user equipment is handed over according to configuration information of each of the at least one candidate secondary base station when the user equipment needs path handover. Therefore, this embodiment of the present invention can relieve a problem of mobility deterioration resulting from frequent handover between cells because cell coverage of a secondary base station in a network is excessively small.

Optionally, in an embodiment, the method further includes: sending a prior-preparation completion message to the network device, where the prior-preparation completion message carries at least one of the following information: information about the access resource preconfigured by the secondary base station for the UE or a TEID allocated by the secondary base station to the UE.

Specifically, the secondary base station needs to send, to the network device, the information about the access resource preconfigured by the secondary base station for the UE, so that the network device sends the configuration information to the UE for access. The TED allocated by the secondary base station to the UE is used by the UE to quickly complete path handover after the UE accesses the secondary base station.

Optionally, in an embodiment of the present invention, the method further includes: sending, by the secondary base station, indication information to the network device when the UE successfully accesses the secondary base station, where the indication information is used to indicate that the UE has successfully accessed the secondary base station.

After the UE successfully accesses the secondary base station, the secondary base station sends an indication message to the network device. The indication message includes the indication information that the UE has successfully accessed the secondary base station, and the indication information includes identification information of the secondary base station. It should be understood that the indication information may be carried in a data frame, for example, may be carried in a data frame of a GTP-U extension header, or may be carried in another indication message. The present invention is not limited thereto. After receiving the message, the network device determines that the UE has successfully accessed the new secondary base station, and delivers, to the new secondary base station, subsequent new data and/or data that has not been transmitted successfully to the secondary base station that the UE had originally accessed.

Based on the foregoing technical solution, according to the method for handover between secondary base stations, the network device, and the user equipment that are provided in this embodiment of the present invention, the network device instructs each of the at least one candidate secondary base station to make the prior path handover preparation, so that the user equipment is handed over according to the configuration information of each of the at least one candidate secondary base station when the user equipment needs path handover. Therefore, this embodiment of the present invention can relieve a problem of mobility deterioration resulting from frequent handover between cells because cell coverage of a secondary base station in a network is excessively small.

The foregoing separately details, with reference to FIG. 2 to FIG. 4, the method for handover between secondary base stations in the embodiments of the present invention from perspectives of a network device and user equipment. The following describes, with reference to FIG. 5 and FIG. 6, the method for handover between secondary base stations in embodiments of the present invention from perspectives of interaction between devices.

Figure 5:
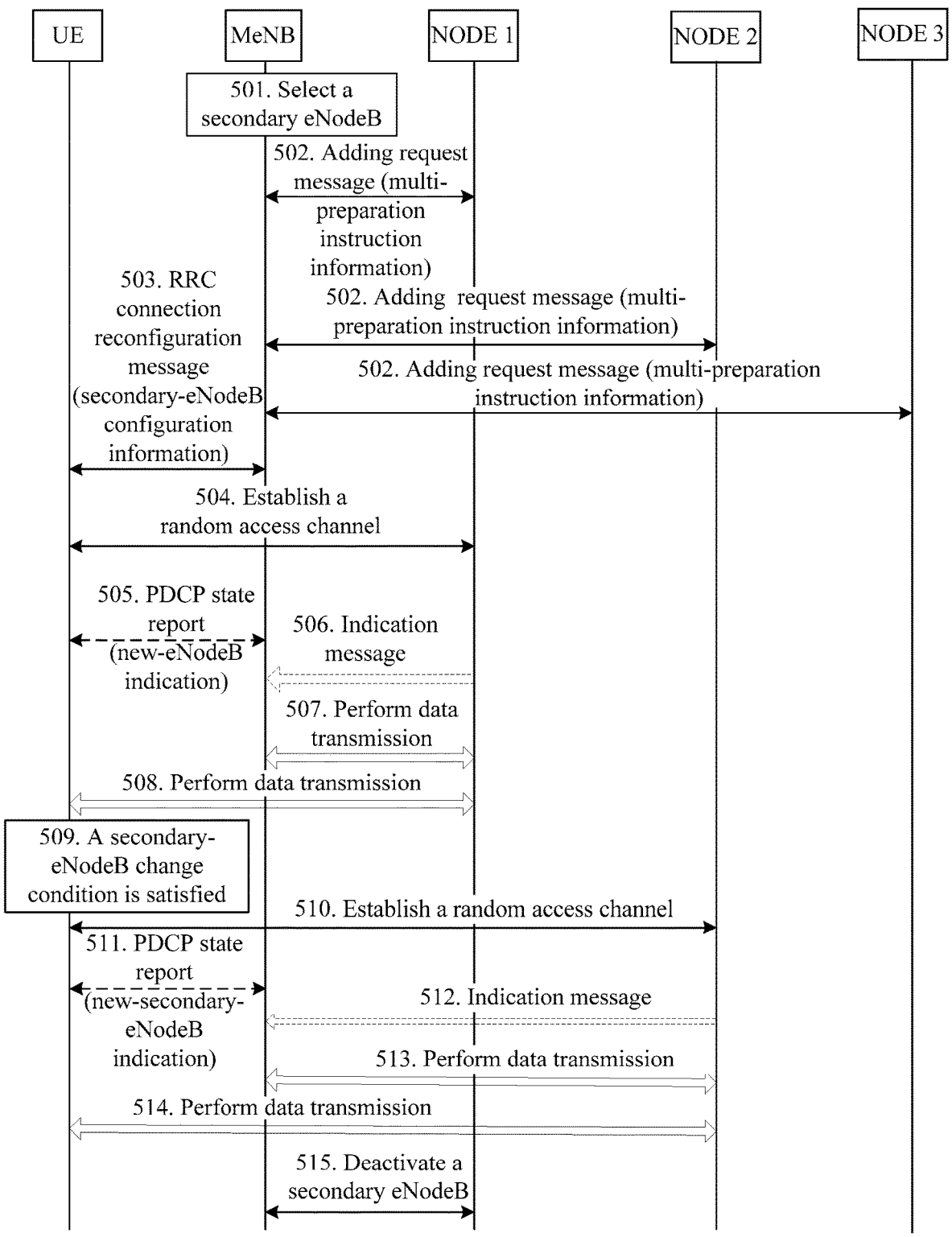
FIG. 5 is a schematic flowchart for handover between secondary base stations according to an embodiment of the present invention.

FIG. 5 is a schematic flowchart for handover between secondary base stations according to an embodiment of the present invention. This embodiment may be applied to a scenario with the network structure shown in FIG. 1A. As shown in FIG. 5, the method includes the following steps.

501. A master eNodeB MeNB determines at least one candidate secondary eNodeB according to a measurement report reported by user equipment UE, where the at least one candidate secondary eNodeB includes a target secondary eNodeB selected by the master eNodeB and other candidate secondary eNodeBs.

502. The master eNodeB sends a secondary-eNodeB adding request message to 5G small cells: a NODE 1, a NODE 2, and a NODE 3, where the message carries a prior-preparation instruction, and the prior-preparation instruction is used to instruct a secondary eNodeB to prepare in advance to serve as a secondary eNodeB. The NODE 1, the NODE 2, and the NODE 3 wait to be selected by the UE as a target secondary eNodeB. For example, after receiving the multi-preparation instruction, the 5G small cells allocate resources for UE access, for example, a random access parameter preamble and a cell temporary identifier of the UE; reserve the resources for the UE for a time period; and wait for access of the UE. To complete subsequent data path handover, a data channel, that is, a GTP-U tunnel, needs to be established in advance between the master eNodeB and the candidate secondary eNodeB in a candidate secondary-eNodeB adding procedure. That is, both the master eNodeB and the candidate secondary eNodeB allocate respective GTP TEIDs to the bearer, and send the GTP TEIDs to the other party for storage.

503. The master eNodeB delivers an RRC connection reconfiguration message to the UE, where the message includes configuration information of the selected target secondary eNodeB and the candidate secondary eNodeBs. The selected target secondary eNodeB may be a candidate secondary eNodeB that the UE first accesses. In addition, the RRC connection reconfiguration message may include a secondary-eNodeB change condition, that is, a condition that the UE can trigger handover between secondary eNodeBs. For example, signal quality of a secondary eNodeB that the UE currently accesses is lower than a specific threshold, and there exists a candidate secondary eNodeB whose signal quality is higher than a specific threshold. For another example, load of a secondary eNodeB that the UE currently accesses is higher than a specific threshold, and there exists a candidate secondary eNodeB whose load is lower than a specific threshold. In this case, the UE satisfies the secondary-eNodeB handover condition and is handed over to the new target secondary eNodeB. The RRC reconfiguration message may indicate a handover policy according to which the UE is to be handed over to the new target secondary eNodeB. For example, the RRC connection reconfiguration message may explicitly distinguish between the selected target secondary eNodeB and the other candidate secondary eNodeBs by using a name of an information element, or may implicitly distinguish between the selected target secondary eNodeB and the other candidate secondary eNodeBs. For example, the $1^{st}$ secondary eNodeB in a base station list is the selected target secondary eNodeB, and secondary eNodeBs following the target secondary eNodeB are the candidate secondary eNodeBs. For another example, the master eNodeB may alternatively provide priorities of the candidate secondary eNodeBs in the RRC connection reconfiguration message, and instruct the UE to preferably access a candidate secondary eNodeB according to the priorities of the candidate secondary eNodeBs.

504. When the target secondary eNodeB selected by the master eNodeB is the NODE 1, the UE accesses the small cell NODE 1. Specifically, the UE initiates an access procedure according to the access resource in the configuration information to access the target secondary eNodeB, and obtains uplink time in the random access process. Optionally, the UE may not initiate random access. The target secondary eNodeB identifies the UE according to the preamble or the pre-allocated cell temporary identifier of the UE.

505. When successfully accessing the target secondary eNodeB NODE 1, the UE may send, to the master eNodeB, indication information that the UE has successfully accessed the target secondary eNodeB.

Specifically, after the successful access, the UE sends a PDCP state report to the master eNodeB, where an indication about the new secondary eNodeB is added to the PDCP state report. In this way, after receiving the indication about the new secondary eNodeB, the master eNodeB considers that the UE has successfully accessed the new secondary eNodeB, and delivers, to the new secondary eNodeB, subsequent new data and/or data that has not been transmitted successfully to an original secondary eNodeB.

506. When the UE successfully accesses the target secondary eNodeB NODE 1, the target secondary eNodeB NODE 1 may send indication information to the master eNodeB, indicating that the UE has successfully accessed the NODE 1.

Specifically, after the UE accesses the new target secondary eNodeB, the new target secondary eNodeB sends an indication to the master eNodeB. The indication may be included in a data frame, that is, a 1-bit indication is added to a data frame of a GTP-U extension header, to indicate that the UE has successfully accessed the new target secondary eNodeB. In this way, after receiving the indication that the UE has accessed the new target secondary eNodeB, the master eNodeB considers that the UE has successfully accessed the new target secondary eNodeB, and delivers, to the new target secondary eNodeB, subsequent new data and/or data that has not been transmitted successfully to the original secondary eNodeB.

507. When the master eNodeB determines that the UE has successfully accessed the target secondary eNodeB, the master eNodeB stops sending data to an original secondary eNodeB that the UE previously accesses, and starts sending data to the target secondary eNodeB NODE 1.

508. When determining that the UE has successfully accessed the target secondary eNodeB, the master eNodeB switches data to the target secondary eNodeB NODE 1 from the original secondary eNodeB that the UE previously accesses.

Data transmission is performed between the UE and the target secondary eNodeB NODE 1, and a path handover process is completed. This process further includes deactivating the original secondary eNodeB that the UE previously accesses.

509. The UE determines the candidate secondary eNodeB NODE 2 as the new target secondary eNodeB when a SeNB change condition is satisfied, for example, when it is detected that signal quality of the secondary eNodeB that the UE currently accesses is lower than a specific threshold and there exists the candidate secondary eNodeB NODE 2 whose signal quality is higher than a specific threshold.

510. After receiving configuration information of the NODE 2, he UE triggers a synchronization and access procedure actively to access the new target secondary eNodeB.

511. When the UE successfully accesses the target secondary eNodeB NODE 2, the target secondary eNodeB NODE 2 may send indication information to the master eNodeB, indicating that the UE has successfully accessed the NODE 2.

512. When determining that the UE has successfully accessed the target secondary eNodeB NODE 2, the master eNodeB switches data to the new target secondary eNodeB NODE 2 from the original secondary eNodeB NODE 1 that the UE previously accesses.

513. When determining that the UE has successfully accessed the target secondary eNodeB NODE 2, the master eNodeB switches data to the target secondary eNodeB from the original secondary eNodeB that the UE previously accesses.

514. Perform data transmission between the UE and the target secondary eNodeB NODE 2, and complete a path handover process.

515. The master eNodeB deactivates the original secondary cell NODE 1.

Another manner of determining a target secondary eNodeB is: The MeNB quickly instructs activation/deactivation of a candidate secondary eNodeB, that is, the master eNodeB determines the target secondary eNodeB. This manner differs from the foregoing method in that:

(1) The MeNB does not need to deliver a secondary-eNodeB change condition to the UE.

(2) The UE reports a measurement report. The master eNodeB MeNB determines, according to information such as the measurement report, whether to activate a new target secondary eNodeB. If determining to activate a new target secondary eNodeB, the MeNB delivers an activation command to the UE. The activation command includes an identifier of the target secondary eNodeB to be activated, and may also include a command for deactivating an original secondary eNodeB. After receiving the activation command, the UE may trigger a synchronization and access procedure to access the target secondary eNodeB. The UE may alternatively complete, in advance, a procedure for accessing each candidate secondary cell, and the UE directly sends uplink data to the new secondary cell after receiving the activation command.

It should be understood that the method for quickly instructing, by the master eNodeB, activation/deactivation of a candidate secondary eNodeB may be corresponding to the foregoing procedure. For brevity, further details are not described herein.

It should also be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Based on the foregoing technical solution, according to the method for handover between secondary eNodeBs, the network device, and the user equipment that are provided in this embodiment of the present invention, the network device instructs each of the at least one candidate secondary eNodeB to make the prior path handover preparation, so that the user equipment is handed over according to the configuration information of each of the at least one candidate secondary eNodeB when the user equipment needs path handover. Therefore, this embodiment of the present invention can relieve a problem of mobility deterioration resulting from frequent handover between cells because cell coverage of a secondary eNodeB in a network is excessively small.

Figure 6:
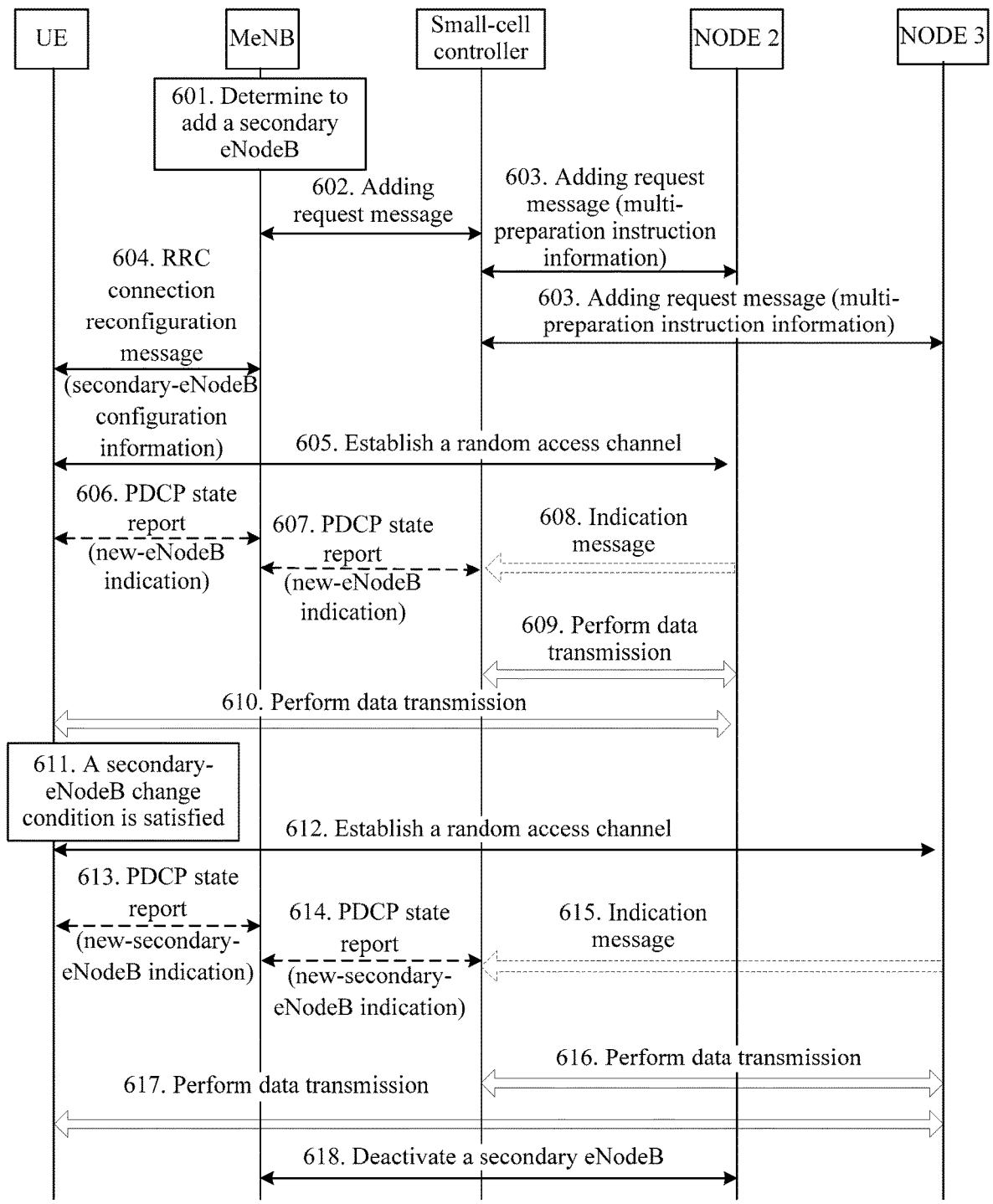
FIG. 6 is a schematic flowchart for handover between secondary base stations according to another embodiment of the present invention.

FIG. 6 is a schematic flowchart for handover between secondary base stations according to another embodiment of the present invention. This embodiment may be applied to a scenario with the network architecture shown in FIG. 1B. As shown in FIG. 6, the method includes the following steps.

601. If determining, according to a measurement result reported by UE and\or service information of the UE, to add a secondary eNodeB to offload data, a master eNodeB MENB sends a secondary-eNodeB adding request message to a small-cell controller (English: Small Cell Controller). The request message includes the measurement and\or the service information. After receiving the message, the small-cell controller selects a secondary eNodeB and candidate secondary eNodeBs according to the included measurement or\and service information.

602. The small-cell controller determines at least one candidate secondary eNodeB according to the measurement result reported by the UE and\or the service information of the UE, where the at least one candidate secondary eNodeB includes the selected target secondary eNodeB and the other candidate secondary eNodeBs.

603. The small-cell controller sends a secondary-eNodeB adding request message to 5G small cells: a NODE 2 and a NODE 3, where the message carries prior-preparation instruction information, and the prior-preparation instruction information is used to instruct a secondary eNodeB to prepare in advance to serve as a secondary eNodeB. The NODE 2 and the NODE 3 wait to be selected by the UE as a target secondary eNodeB. After receiving the multi-preparation instruction, the candidate secondary eNodeBs allocate resources required for random access, for example, a random access parameter preamble; reserve the resources for the UE for a time period; and wait for access of the UE. To complete subsequent data path handover, a data channel, that is, a GTP-U tunnel, needs to be established in advance between the master eNodeB and the candidate secondary eNodeB in a secondary-eNodeB adding procedure. Both the small-cell controller and the secondary eNodeB allocate respective GTP TEIDs to the bearer, and send the GTP TEIDs to the other party for storage.

604. The small-cell controller delivers an RRC connection reconfiguration message to the UE, where the message includes configuration information of the selected target secondary eNodeB and the candidate secondary eNodeBs. The selected target secondary eNodeB may be a secondary eNodeB that the UE first accesses. In addition, the RRC connection reconfiguration message may include a secondary-eNodeB change condition, that is, a condition that the UE can trigger handover between secondary eNodeBs. For example, signal quality of a secondary eNodeB that the UE currently accesses is lower than a specific threshold, and there exists another candidate secondary eNodeB whose signal quality is higher than a specific threshold. For another example, load of a secondary eNodeB that the UE currently accesses is higher than a specific threshold, and there exists a candidate secondary eNodeB whose load is lower than a specific threshold. The message may explicitly distinguish between the selected secondary eNodeB and the candidate secondary eNodeBs by using a name of an information element, or may implicitly distinguish between the selected secondary eNodeB and the candidate secondary eNodeBs. For example, the $1^{st}$ secondary eNodeB in a base station list is the selected target secondary eNodeB, and secondary eNodeBs following the target secondary eNodeB are the candidate secondary eNodeBs. Alternatively, the message carries priority information of the candidate secondary eNodeBs, to instruct the UE to access a candidate secondary eNodeB according to the priority information.

605. When the target secondary eNodeB selected by the master eNodeB is the NODE 2, a random access channel is established between the UE and the NODE 2.

606. When successfully accessing the target secondary eNodeB NODE 2, the UE may send, to the master eNodeB, indication information that the UE has successfully accessed the target secondary eNodeB NODE 2.

Specifically, after the successful access, the UE sends a PDCP state report to the master eNodeB, where an indication about the new secondary eNodeB is added to the PDCP state report. In this way, after receiving the indication about the new secondary eNodeB, the master eNodeB considers that the UE has successfully accessed the new secondary eNodeB, and delivers, to the new secondary eNodeB, subsequent new data and/or data that has not been transmitted successfully to an original secondary eNodeB.

607. When successfully accessing the target secondary eNodeB RTA 2, the UE may send, to the master eNodeB, indication information that the UE has successfully accessed the target secondary eNodeB, and the master eNodeB forwards, to the small-cell controller, the indication information that the UE has successfully accessed the target secondary eNodeB NODE 2.

608. When the UE successfully accesses the target secondary eNodeB NODE 2, the target secondary eNodeB NODE 2 may send indication information to the small-cell controller, indicating that the UE has successfully accessed the NODE2.

Specifically, after the UE accesses the new secondary eNodeB, the new secondary eNodeB sends an indication to the small-cell controller. The indication may be included in a data frame, that is, a 1-bit indication is added to a data frame of a GTP-U extension header, to indicate that the UE has successfully accessed the new target secondary eNodeB. In this way, after receiving the indication about the new target secondary eNodeB, the master eNodeB considers that the UE has successfully accessed the new secondary eNodeB, and delivers, to the new target secondary eNodeB, subsequent new data and/or data that has not been transmitted successfully to the original secondary eNodeB.

609. When the master eNodeB determines that the UE has successfully accessed the target secondary eNodeB, the master eNodeB stops sending data to an original secondary eNodeB that the UE previously accesses, and starts sending data to the target secondary eNodeB NODE 2.

610. When determining that the UE has successfully accessed the target secondary eNodeB, the master eNodeB switches data to the target secondary eNodeB NODE 2 from the original secondary eNodeB that the UE previously accesses.

Data transmission is performed between the UE and the target secondary eNodeB NODE 2, and a path handover process is completed. This process further includes deactivating the original eNodeB that the UE previously accesses.

611. The UE determines the candidate secondary eNodeB NODE 3 as the new target secondary eNodeB when a SeNB change condition is satisfied, for example, when the UE detects that signal quality of the selected secondary eNodeB is lower than a specific threshold and signal quality of the candidate secondary eNodeB NODE 3 is higher than a specific threshold.

612. After receiving configuration information of the NODE 3, the UE triggers a synchronization and access procedure actively to access the new target secondary eNodeB.

613. When the UE successfully accesses the target secondary eNodeB NODE 3, the target secondary eNodeB NODE 3 may send indication information to the master eNodeB, indicating that the UE has successfully accessed the NODE 3.

614. When successfully accessing the target secondary eNodeB NODE 3, the UE may send, to the master eNodeB, indication information that the UE has successfully accessed the target secondary eNodeB, and the master eNodeB forwards, to the small-cell controller, the indication information that the UE has successfully accessed the target secondary eNodeB NODE 3.

615. When the UE successfully accesses the target secondary eNodeB NODE 3, the target secondary eNodeB NODE 3 sends, to the small-cell controller, indication information that the UE has successfully accessed the target secondary eNodeB NODE 3.

616. When determining that the UE has successfully accessed the target secondary eNodeB NODE 3, the small-cell controller switches data to the new target secondary eNodeB NODE 3 from the original secondary eNodeB NODE 2 that the UE previously accesses.

617. When determining that the UE has successfully accessed the target secondary eNodeB, NODE 3, the master eNodeB switches data to the target secondary eNodeB NODE 3 from the original secondary eNodeB that the UE previously accesses.

618. Perform data transmission between the UE and the target secondary eNodeB NODE 3, and complete a path handover process. 515. The master eNodeB deactivates the original secondary cell NODE 2.

Another manner of determining a target secondary eNodeB is: The MeNB quickly instructs activation/deactivation of a candidate secondary eNodeB, that is, the master eNodeB determines the target secondary eNodeB. This manner differs from the foregoing method in that:

(1) The MeNB does not need to deliver a secondary-eNodeB change condition to the UE.

(2) The UE reports a measurement report. The small-cell controller MeNB determines, according to information such as the measurement report, whether to activate a new target secondary eNodeB. If determining to activate a new target secondary eNodeB, the MeNB delivers an activation command to the UE. The activation command includes an identifier of the target secondary eNodeB to be activated, and may also include a command for deactivating an original secondary eNodeB. After receiving the activation command, the UE may trigger a synchronization and access procedure to access the target secondary eNodeB. The UE may alternatively complete, in advance, a procedure for accessing each candidate secondary cell, and the UE directly sends uplink data to the new secondary cell after receiving the activation command.

It should be understood that the method for quickly instructing, by the master eNodeB, activation/deactivation of a candidate secondary eNodeB may be corresponding to the foregoing procedure. For brevity, further details are not described herein.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Based on the foregoing technical solution, according to the method for handover between secondary eNodeBs, the network device, and the user equipment that are provided in this embodiment of the present invention, the network device instructs each of the at least one candidate secondary eNodeB to make the prior path handover preparation, so that the user equipment is handed over according to the configuration information of each of the at least one candidate secondary eNodeB when the user equipment needs path handover. Therefore, this embodiment of the present invention can relieve a problem of mobility deterioration resulting from frequent handover between cells because cell coverage of a secondary eNodeB in a network is excessively small.

Figure 7:
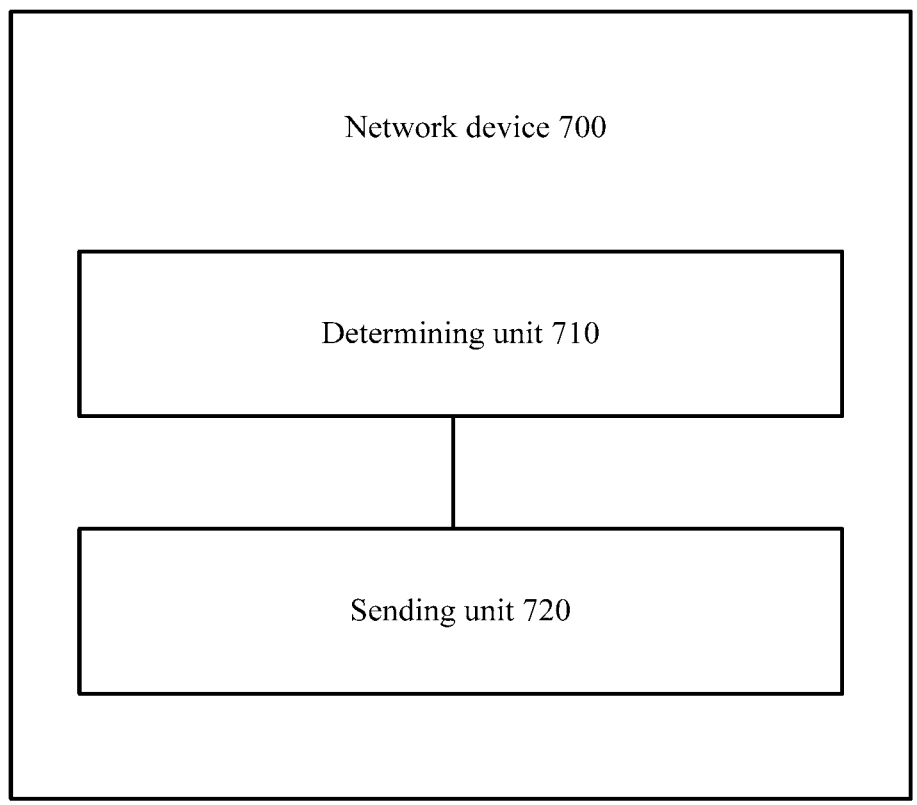
FIG. 7 is a schematic block diagram of a network device according to an embodiment of the present invention.

The foregoing details, with reference to FIG. 1 to FIG. 6, the method for handover between paths in the embodiments of the present invention. The following details, with reference to FIG. 7 to FIG. 12, a network device and user equipment for handover between paths in embodiments of the present invention. FIG. 7 shows a network device for handover between secondary base stations according to an embodiment of the present invention. As shown in FIG. 7, the network device 700 includes:

a determining unit 710, where the determining unit 710 is configured to determine to send prior-preparation instruction information to each of at least one candidate secondary base station, where the prior-preparation instruction information is used to instruct each of the at least one candidate secondary base station to make a path handover preparation, and the path handover preparation includes at least one of the following: preconfiguring an access resource for user equipment UE or establishing a data transmission channel with the network device; and a sending unit 720, where the sending unit 720 is configured to send the prior-preparation instruction information to each of the at least one candidate secondary base station, where the prior-preparation instruction information is used to instruct each of the at least one candidate secondary base station to make the path handover preparation, and the path handover preparation includes at least one of the following: preconfiguring an access resource for user equipment UE or establishing a data transmission channel with the network device.

The sending unit 720 is further configured to send configuration information of each of the at least one candidate secondary base station to the UE, so that the UE is handed over to a target secondary base station in the at least one candidate secondary base station according to the configuration information of each of the at least one candidate secondary base station when the UE needs to be handed over between secondary base stations.

Specifically, the prior-preparation instruction information sent by the sending unit 720 is used to instruct each of the at least one candidate secondary base station to make the path handover preparation, so that each of the at least one candidate secondary base station waits to be selected by the UE as the target secondary base station.

Based on the foregoing technical solution, according to the method for handover between secondary base stations, the network device, and the user equipment that are provided in this embodiment of the present invention, the network device instructs each of the at least one candidate secondary base station to make the prior path handover preparation, so that the user equipment is handed over according to the configuration information of each of the at least one candidate secondary base station when the user equipment needs path handover. Therefore, this embodiment of the present invention can relieve a problem of mobility deterioration resulting from frequent handover between cells because cell coverage of a secondary base station in a network is excessively small.

Optionally, in an embodiment of the present invention, the configuration information of each of the at least one candidate secondary base station includes at least one of the following: information about the access resource preconfigured by each candidate secondary base station for the UE or uplink grant information preconfigured by each candidate secondary base station for the UE.

Optionally, in an embodiment of the present invention, the sending unit 720 is further configured to send a first indication message to the UE, where the first indication message is used to indicate a handover trigger condition for handover of the UE, and the handover trigger condition includes at least one of the following conditions: signal quality of a secondary base station that the UE currently accesses is lower than a first threshold, signal quality of a first candidate secondary base station in the at least one candidate secondary base station is higher than a second threshold, load of a secondary base station that the UE currently accesses is higher than a third threshold, or signal quality of a second candidate secondary base station in the at least one candidate secondary base station is lower than a fourth threshold.

Optionally, in an embodiment of the present invention, the determining unit 710 is further configured to determine priority information of each of the at least one candidate secondary base station according to current state information of each of the at least one candidate secondary base station; and the sending unit is further configured to send the priority information of each of the at least one candidate secondary base station to the UE, so that the UE is preferably handed over to the target secondary base station in the at least one candidate secondary base station according to the priority information of each of the at least one candidate secondary base station.

Optionally, in an embodiment of the present invention, the determining unit 710 is further configured to determine completion of an access process between the UE and the target secondary base station; and the sending unit 720 is further configured to send data to the target secondary base station, so that data transmission is performed between the UE and the secondary base station.

Optionally, in an embodiment of the present invention, the network device 700 further includes: a first receiving unit, where the first receiving unit is configured to receive a second indication message sent by the UE, where the second indication message is used to indicate that the UE has successfully accessed the target secondary base station; and/or the second receiving unit is configured to receive a third indication message sent by the target secondary base station, where the third indication message is used to indicate that the UE has successfully accessed the target secondary base station.

Optionally, in an embodiment of the present invention, the network device 700 is a small-cell controller, and the network device 700 further includes: a second receiving unit, where the second receiving unit is configured to receive a measurement report of the UE sent by a master base station, where the measurement report includes results of measurement performed by the UE on multiple secondary base stations; and the determining unit 710 is further configured to determine the at least one candidate secondary base station from the multiple secondary base stations according to the measurement report.

It should be understood that the network device 700 in this embodiment of the present invention may be corresponding to the entities that execute the method for handover between secondary base stations in the embodiments of the present invention. In addition, the foregoing and other operations and/or functions of the modules in the network device 700 are to implement corresponding procedures of the methods in FIG. 2 to FIG. 4 and the methods in FIG. 5 and FIG. 6. For brevity, further details are not described herein.

Based on the foregoing technical solution, according to the method for handover between secondary base stations, the network device, and the user equipment that are provided in this embodiment of the present invention, the network device instructs each of the at least one candidate secondary base station to make the prior path handover preparation, so that the user equipment is handed over according to the configuration information of each of the at least one candidate secondary base station when the user equipment needs path handover. Therefore, this embodiment of the present invention can relieve a problem of mobility deterioration resulting from frequent handover between cells because cell coverage of a secondary base station in a network is excessively small.

Figure 8:
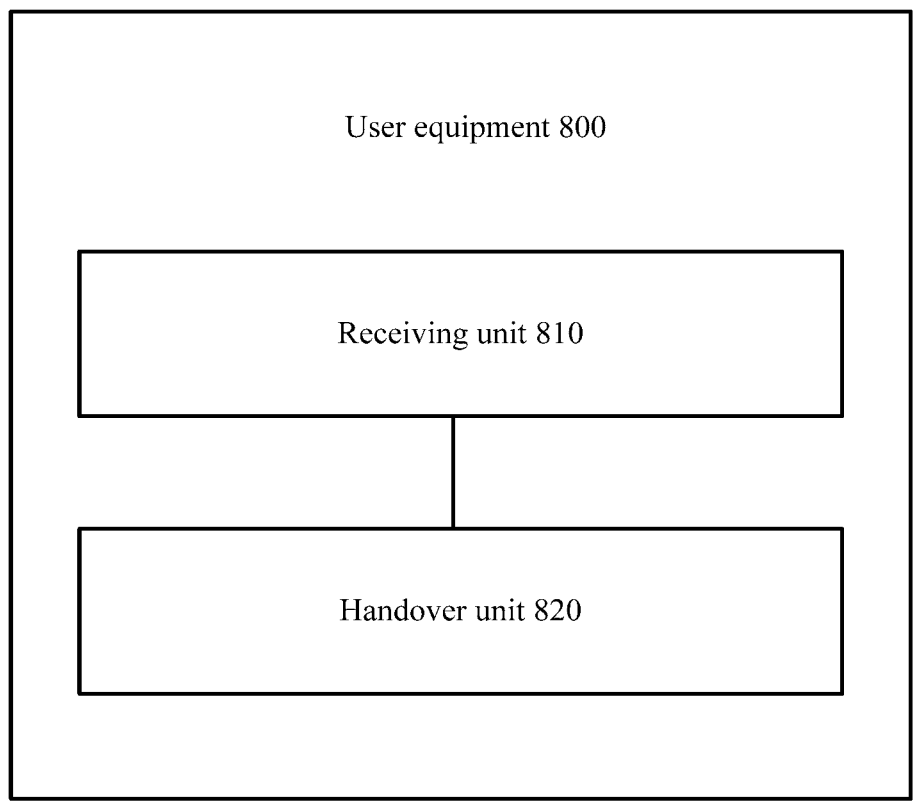
FIG. 8 is a schematic block diagram of user equipment according to an embodiment of the present invention.

FIG. 8 is a schematic block diagram of user equipment according to an embodiment of the present invention. As shown in FIG. 8, the user equipment 800 includes:

a receiving unit 810, where the receiving unit 810 is configured to receive configuration information of each of at least one candidate secondary base station sent by a network device, where each of the at least one candidate secondary base station has made a path handover preparation and is waiting to be selected by the UE as a target secondary base station, and the path handover preparation includes at least one of the following: preconfiguring an access resource for the UE or establishing a data transmission channel with the network device; and a handover unit 820, where the handover unit 820 is configured to hand over the UE to the target secondary base station in the at least one candidate secondary base station according to the configuration information of each of the at least one candidate secondary base station when the UE needs to be handed over between secondary base stations.

Based on the foregoing technical solution, according to the method for handover between secondary base stations, the network device, and the user equipment that are provided in this embodiment of the present invention, the network device instructs each of the at least one candidate secondary base station to make the prior path handover preparation, so that the user equipment is handed over according to the configuration information of each of the at least one candidate secondary base station when the user equipment needs path handover. Therefore, this embodiment of the present invention can relieve a problem of mobility deterioration resulting from frequent handover between cells because cell coverage of a secondary base station in a network is excessively small.

Optionally, in an embodiment of the present invention, the configuration information of each of the at least one candidate secondary base station includes at least one of the following: information about the access resource preconfigured by each candidate secondary base station for the UE or uplink grant information preconfigured by each candidate secondary base station for the UE.

Optionally, in an embodiment of the present invention, the receiving unit 810 is further configured to: receive a first indication message sent by the network device, and determine, according to the first indication message, that the UE needs to be handed over between secondary base stations, where the first indication message is used to indicate a handover trigger condition for handover of the UE, and the trigger condition includes at least one of the following conditions: signal quality of a secondary base station that the UE currently accesses is lower than a first threshold; signal quality of a first candidate secondary base station in the at least one candidate secondary base station is higher than a second threshold; load of a secondary base station that the UE currently accesses is higher than a third threshold; or load of a second candidate secondary base station in the at least one candidate secondary base station is lower than a fourth threshold.

Optionally, in an embodiment of the present invention, the receiving unit 810 is specifically configured to: receive a second indication message sent by the network device, where the second indication message carries priority information of each of the at least one candidate secondary base station; and determine the target secondary base station according to the priority information of each of the at least one candidate secondary base station; and the handover unit 820 is specifically configured to hand over the UE to the target secondary base station according to the second indication message and configuration information of the target secondary base station.

Optionally, in an embodiment of the present invention, the user equipment 800 further includes: a sending unit, where the sending unit is configured to send a measurement report of the UE to the network device, where the measurement report is used by the network device to determine the target secondary base station according to the measurement report; and the receiving unit 810 is configured to: receive a third indication message sent by the network device, and determine, according to the third indication message, that the UE needs to be handed over between secondary base stations, where the third indication message is used to instruct the UE to be handed over to the target secondary base station.

Optionally, in an embodiment of the present invention, the user equipment 800 further includes: a sending unit, where the sending unit is configured to send a fourth indication message to the network device after the UE accesses the target secondary base station, where the fourth indication message is use to indicate that the UE has successfully accessed the target secondary base station.

It should be understood that the user equipment 800 in this embodiment of the present invention may be corresponding to the entities that execute the method for handover between secondary base stations in the embodiments of the present invention. In addition, the foregoing and other operations and/or functions of the modules in the user equipment 800 are to implement corresponding procedures of the methods in FIG. 2 to FIG. 4 and the methods in FIG. 5 and FIG. 6. For brevity, further details are not described herein. Based on the foregoing technical solution, according to the method for handover between secondary base stations, the network device, and the user equipment that are provided in this embodiment of the present invention, the network device instructs each of the at least one candidate secondary base station to make the prior path handover preparation, so that the user equipment is handed over according to the configuration information of each of the at least one candidate secondary base station when the user equipment needs path handover. Therefore, this embodiment of the present invention can relieve a problem of mobility deterioration resulting from frequent handover between cells because cell coverage of a secondary base station in a network is excessively small.

Figure 9:
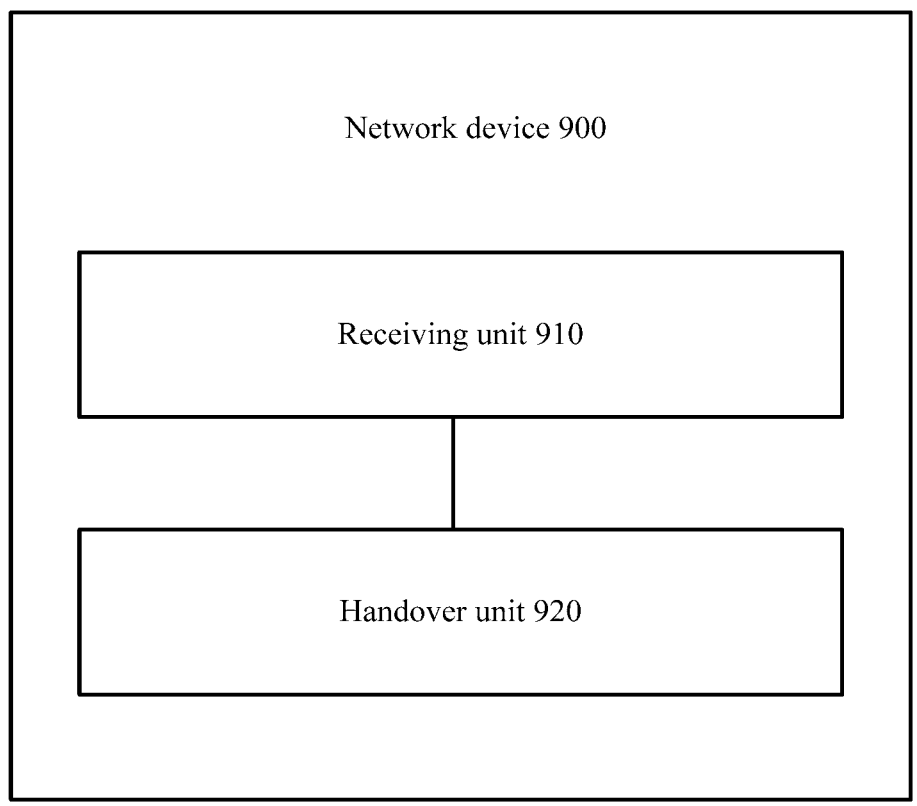
FIG. 9 is a schematic block diagram of a network device according to another embodiment of the present invention.

FIG. 9 shows a schematic block diagram of a network device according to an embodiment of the present invention. As shown in FIG. 9, the network device 900 includes:

a receiving unit 910, where the receiving unit 910 is configured to receive prior-preparation instruction information sent by a first network device, where the prior-preparation instruction information is used to instruct the network device to make a path handover preparation, and the path handover preparation includes at least one of the following: preconfiguring an access resource for user equipment UE or establishing a data transmission channel corresponding to the UE with the first network device; and a handover unit 920, configured to: make the path handover preparation according to the prior-preparation instruction information, and wait for the UE to be handed over to the secondary base station.

Based on the foregoing technical solution, according to the method for handover between secondary base stations, the network device, and the user equipment that are provided in this embodiment of the present invention, the network device instructs each of the at least one candidate secondary base station to make the prior path handover preparation, so that the user equipment is handed over according to configuration information of each of the at least one candidate secondary base station when the user equipment needs path handover. Therefore, this embodiment of the present invention can relieve a problem of mobility deterioration resulting from frequent handover between cells because cell coverage of a secondary base station in a network is excessively small.

Optionally, in an embodiment of the present invention, the network device 900 further includes: a sending unit, where the sending unit sends a prior-preparation completion message to the first network device, where the prior-preparation completion message carries at least one of the following information: information about the access resource preconfigured by the network device for the UE or a TEID allocated by the network device to the UE.

Optionally, in an embodiment of the present invention, the sending unit is further configured to send indication information to the first network device when the UE successfully accesses the network device, where the indication information is used to indicate that the UE has successfully accessed the network device.

It should be understood that the network device 900 in this embodiment of the present invention may be corresponding to the entities that execute the method for handover between secondary base stations in the embodiments of the present invention. In addition, the foregoing and other operations and/or functions of the modules in the network device 800 are to implement corresponding procedures of the methods in FIG. 2 to FIG. 4 and the methods in FIG. 5 and FIG. 6. For brevity, further details are not described herein.

Based on the foregoing technical solution, according to the method for handover between secondary base stations, the network device, and the user equipment that are provided in this embodiment of the present invention, the network device instructs each of the at least one candidate secondary base station to make the prior path handover preparation, so that the user equipment is handed over according to the configuration information of each of the at least one candidate secondary base station when the user equipment needs path handover. Therefore, this embodiment of the present invention can relieve a problem of mobility deterioration resulting from frequent handover between cells because cell coverage of a secondary base station in a network is excessively small.

Figure 10:
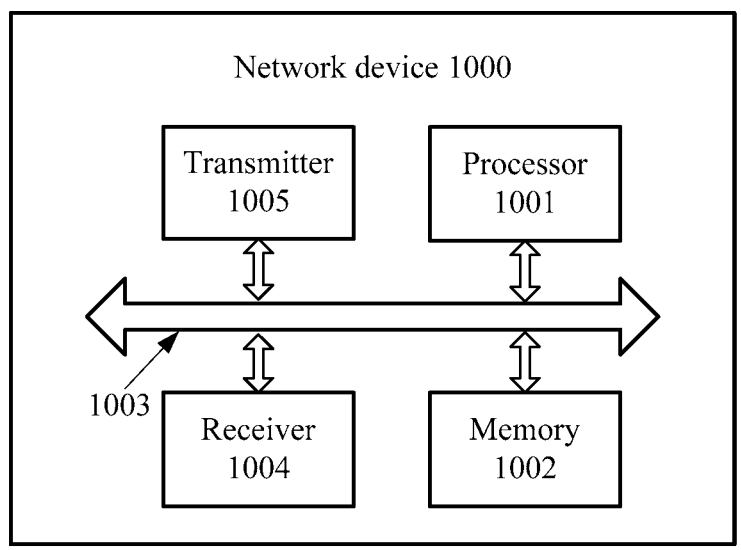
FIG. 10 is a schematic block diagram of an apparatus of a network device according to an embodiment of the present invention.

Referring to FIG. 10, an embodiment of the present invention further provides a network device 1000, where the network device 1000 includes a processor 1001, a memory 1002, a bus system 1003, a receiver 1004, and a transmitter 1005. The processor 1001, the memory 1002, and the receiver 1004 are connected by using the bus system 1003, the memory 1002 is configured to store an instruction, and the processor 1001 is configured to execute the instruction stored in the memory 1002, and control the receiver 1004 to receive information. The transmitter 1005 is configured to: send prior-preparation instruction information to each of at least one candidate secondary base station, where the prior-preparation instruction information is used to instruct each of the at least one candidate secondary base station to make a path handover preparation, and the path handover preparation includes at least one of the following: preconfiguring an access resource for user equipment UE or establishing a data transmission channel with the network device; and send configuration information of each of the at least one candidate secondary base station to the UE, so that the UE is handed over to a target secondary base station in the at least one candidate secondary base station according to the configuration information of each of the at least one candidate secondary base station when the UE needs to be handed over between secondary base stations.

Specifically, the transmitter 1005 is specifically configured to send the prior-preparation instruction information to each of the at least one candidate secondary base station, where the prior-preparation instruction information is used to instruct each of the at least one candidate secondary base station to make the path handover preparation, so that each of the at least one candidate secondary base station waits to be selected by the user equipment UE as the target secondary base station.

Based on the foregoing technical solution, according to the method for handover between secondary base stations, the network device, and the user equipment that are provided in this embodiment of the present invention, the network device instructs each of the at least one candidate secondary base station to make the prior path handover preparation, so that the user equipment is handed over according to the configuration information of each of the at least one candidate secondary base station when the user equipment needs path handover. Therefore, this embodiment of the present invention can relieve a problem of mobility deterioration resulting from frequent handover between cells because cell coverage of a secondary base station in a network is excessively small.

It should be understood that in this embodiment of the present invention, the processor 1001 may be a central processing unit (Central Processing Unit, "CPU" for short), and the processor 1001 may alternatively be another general purpose processor, a digital signal processor (DSP), an application-specific integrated circuit (ASIC), a field programmable gate array (FPGA) or other programmable logic device, a discrete gate or transistor logic device, a discrete hardware component, or the like. The general purpose processor may be a microprocessor, or the processor may be any conventional processor or the like.

The memory 1002 may include a read-only memory and a random access memory, and provide the instruction and data for the processor 1001. A part of the memory 1002 may further include a non-volatile random access memory. For example, the memory 1002 may further store device type information.

The bus system 1003 may include not only a data bus but also a power bus, a control bus, a status signal bus, and the like. However, for clear description, various buses are denoted by the bus system 1003 in the figure.

During implementation, the steps of the methods may be implemented by an integrated logic circuit of hardware in the processor 1001 or by a software instruction. The steps of the methods disclosed with reference to the embodiments of the present invention may be directly implemented by a hardware processor, or may be implemented by a combination of hardware and a software module in a processor. The software module may be located in a random access memory, a flash memory, a read-only memory, a programmable read-only memory or an electrically erasable programmable memory, a register, or another mature storage medium in the art. The storage medium is located in the memory 1002, and the processor 1001 reads the information from the memory 1002 and implements, in combination with hardware of the processor 1001, the steps of the foregoing methods. To avoid repetition, no detailed description is provided herein again.

Optionally, in an embodiment of the present invention, the configuration information of each of the at least one candidate secondary base station includes at least one of the following: information about the random access resource preconfigured by each candidate secondary base station for the UE or uplink grant information preconfigured by each candidate secondary base station for the UE.

Optionally, in an embodiment, the transmitter 1005 is further configured to send a first indication message to the UE, where the first indication message is used to indicate a handover trigger condition for handover of the UE, and the handover trigger condition includes at least one of the following conditions: signal quality of a secondary base station that the UE currently accesses is lower than a first threshold, signal quality of a first candidate secondary base station in the at least one candidate secondary base station is higher than a second threshold, load of a secondary base station that the UE currently accesses is higher than a third threshold, or signal quality of a second candidate secondary base station in the at least one candidate secondary base station is lower than a fourth threshold.

Optionally, in an embodiment, the processor 1001 is further configured to determine priority information of each of the at least one candidate secondary base station according to current state information of each of the at least one candidate secondary base station; and the transmitter 1005 is further configured to send the priority information of each of the at least one candidate secondary base station to the UE, so that the UE is preferably handed over to the target secondary base station in the at least one candidate secondary base station according to the priority information of each of the at least one candidate secondary base station.

Optionally, in an embodiment, the processor 1001 is further configured to determine completion of an access process between the UE and the target secondary base station; and the transmitter 1005 is configured to send data to the target secondary base station, so that data transmission is performed between the UE and the secondary base station.

Optionally, in an embodiment, the receiver 1004 is further configured to receive a second indication message sent by the UE, where the second indication message is used to indicate that the UE has successfully accessed the target secondary base station; and/or the receiver 1004 is configured to receive a third indication message sent by the target secondary base station, where the third indication message is used to indicate that the UE has successfully accessed the target secondary base station.

Optionally, in an embodiment of the present invention, the network device 1000 is a small-cell controller, and the receiver 1004 is further configured to receive a measurement report of the UE sent by a master base station, where the measurement report includes results of measurement performed by the UE on multiple secondary base stations; and the processor 1001 is configured to determine the at least one candidate secondary base station from the multiple secondary base stations.

Based on the foregoing technical solution, according to the method for handover between secondary base stations, the network device, and the user equipment that are provided in this embodiment of the present invention, the network device instructs each of the at least one candidate secondary base station to make the prior path handover preparation, so that the user equipment is handed over according to the configuration information of each of the at least one candidate secondary base station when the user equipment needs path handover. Therefore, this embodiment of the present invention can relieve a problem of mobility deterioration resulting from frequent handover between cells because cell coverage of a secondary base station in a network is excessively small.

Figure 11:
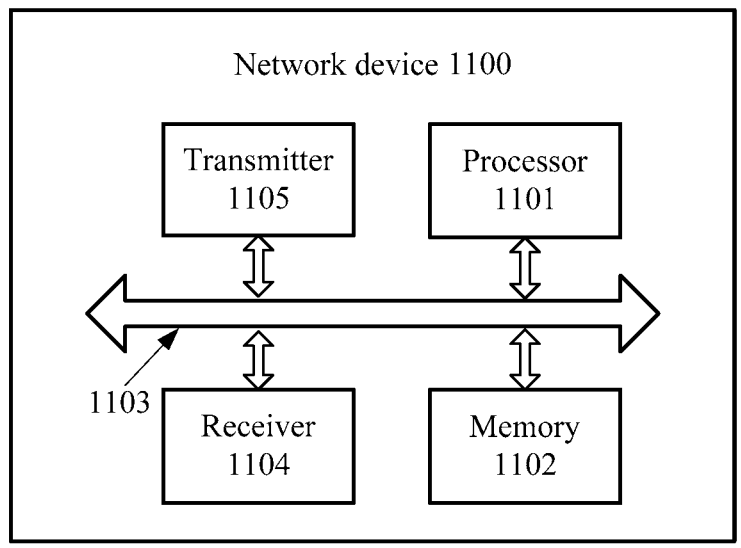
FIG. 11 is a schematic block diagram of an apparatus of a network device according to another embodiment of the present invention.

Referring to FIG. 11, an embodiment of the present invention further provides a network device 1100, where the network device 1100 includes a processor 1101, a memory 1102, a bus system 1103, a receiver 1104, and a transmitter 1105. The processor 1101, the memory 1102, and the receiver 1104 are connected by using the bus system 1103, the memory 1102 is configured to store an instruction, and the processor 1101 is configured to execute the instruction stored in the memory 1102, and control the receiver 1104 to receive information. The receiver 1104 is configured to receive configuration information of each of at least one candidate secondary base station sent by a network device, where each of the at least one candidate secondary base station has made a path handover preparation and is waiting to be selected by the UE as a target secondary base station, and the path handover preparation includes at least one of the following: preconfiguring an access resource for the UE or establishing a data transmission channel with the network device; and the processor 1101 is configured to hand over the UE to the target secondary base station in the at least one candidate secondary base station according to the configuration information of each of the at least one candidate secondary base station when the UE needs to be handed over between secondary base stations.

Based on the foregoing technical solution, according to the method for handover between secondary base stations, the network device, and the user equipment that are provided in this embodiment of the present invention, the network device instructs each of the at least one candidate secondary base station to make the prior path handover preparation, so that the user equipment is handed over according to the configuration information of each of the at least one candidate secondary base station when the user equipment needs path handover. Therefore, this embodiment of the present invention can relieve a problem of mobility deterioration resulting from frequent handover between cells because cell coverage of a secondary base station in a network is excessively small.

It should be understood that in this embodiment of the present invention, the processor 1101 may be a central processing unit (CPU), and the processor 1101 may alternatively be another general purpose processor, a digital signal processor (DSP), an application-specific integrated circuit (ASIC), a field programmable gate array (FPGA) or other programmable logic device, a discrete gate or transistor logic device, a discrete hardware component, or the like. The general purpose processor may be a microprocessor, or the processor may be any conventional processor or the like.

The memory 1102 may include a read-only memory and a random access memory, and provide the instruction and data for the processor 1101. A part of the memory 1102 may further include a non-volatile random access memory. For example, the memory 1102 may further store device type information.

The bus system 1103 may include not only a data bus but also a power bus, a control bus, a status signal bus, and the like. However, for clear description, various buses are denoted by the bus system 1103 in the figure.

During implementation, the steps of the methods may be implemented by an integrated logic circuit of hardware in the processor 1101 or by a software instruction. The steps of the methods disclosed with reference to the embodiments of the present invention may be directly implemented by a hardware processor, or may be implemented by a combination of hardware and a software module in a processor. The software module may be located in a random access memory, a flash memory, a read-only memory, a programmable read-only memory or an electrically erasable programmable memory, a register, or another mature storage medium in the art. The storage medium is located in the memory 1102, and the processor 1101 reads the information from the memory 1102 and implements, in combination with hardware of the processor 1101, the steps of the foregoing methods. To avoid repetition, no detailed description is provided herein again.

Optionally, in an embodiment of the present invention, the configuration information of each of the at least one candidate secondary base station includes at least one of the following: identification information of each candidate secondary base station, information about the random access resource preconfigured by each candidate secondary base station for the UE, a UE identifier allocated by each candidate secondary base station for the UE, or uplink grant information preconfigured by each candidate secondary base station for the UE.

Optionally, in an embodiment, the receiver 1104 is further configured to: receive a first indication message sent by the network device, and determine, according to the first indication message, that the UE needs to be handed over between secondary base stations, where the first indication message is used to indicate a handover trigger condition for handover of the UE, and the trigger condition includes at least one of the following conditions: signal quality of a secondary base station that the UE currently accesses is lower than a first threshold; signal quality of a first candidate secondary base station in the at least one candidate secondary base station is higher than a second threshold; load of a secondary base station that the UE currently accesses is higher than a third threshold; or load of a second candidate secondary base station in the at least one candidate secondary base station is lower than a fourth threshold.

Optionally, in an embodiment, the receiver 1104 is further configured to: receive a second indication message sent by the network device, where the second indication message carries priority information of each of the at least one candidate secondary base station; and determine the target secondary base station according to the priority information of each of the at least one candidate secondary base station; and the processor 1101 is configured to hand over the UE to the target secondary base station according to the second indication message and configuration information of the target secondary base station.

Optionally, in an embodiment, the transmitter 1105 is further configured to send a measurement report of the UE to the network device, where the measurement report is used by the network device to determine the target secondary base station according to the measurement report; and the receiver 1104 is further configured to: receive a third indication message sent by the network device, and determine, according to the third indication message, that the UE needs to be handed over between secondary base stations, where the third indication message is used to instruct the UE to be handed over to the target secondary base station.

Optionally, in an embodiment, the transmitter 1105 is further configured to send a fourth indication message to the network device after the UE accesses the target secondary base station, where the fourth indication message is use to indicate that the UE has successfully accessed the target secondary base station.

Based on the foregoing technical solution, according to the method for handover between secondary base stations, the network device, and the user equipment that are provided in this embodiment of the present invention, the network device instructs each of the at least one candidate secondary base station to make the prior path handover preparation, so that the user equipment is handed over according to the configuration information of each of the at least one candidate secondary base station when the user equipment needs path handover. Therefore, this embodiment of the present invention can relieve a problem of mobility deterioration resulting from frequent handover between cells because cell coverage of a secondary base station in a network is excessively small.

Figure 12:
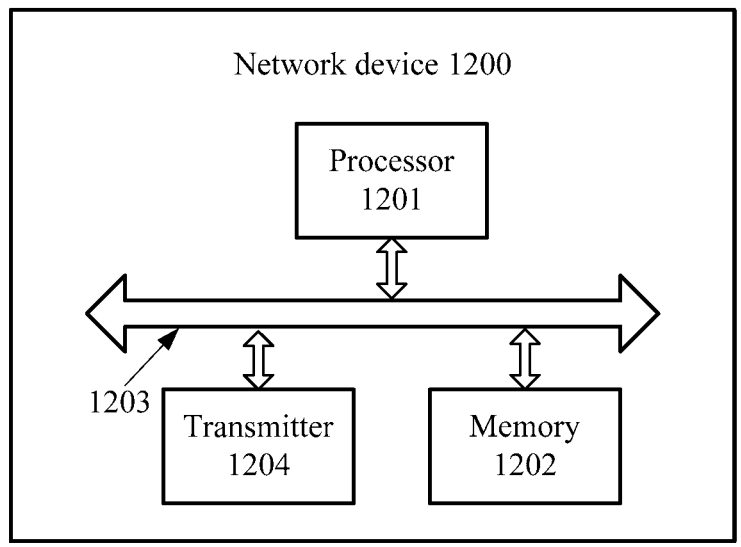
FIG. 12 is a schematic block diagram of an apparatus of a network device according to another embodiment of the present invention.

Referring to FIG. 12, an embodiment of the present invention further provides a network device 1200, where the network device 1200 includes a processor 1201, a memory 1202, a bus system 1203, and a transmitter 1204. The processor 1201, the memory 1202, and the transmitter 1204 are connected by using the bus system 1203, the memory 1202 is configured to store an instruction, and the processor 1201 is configured to execute the instruction stored in the memory 1202, and control the transmitter 1204 to receive information. The transmitter 1204 is configured to receive prior-preparation instruction information sent by a first network device, where the prior-preparation instruction information is used to instruct the network device to make a path handover preparation, and the path handover preparation includes at least one of the following: preconfiguring an access resource for user equipment UE or establishing a data transmission channel corresponding to the UE with the first network device; and the processor 1201 is configured to: make the path handover preparation according to the prior-preparation instruction information, and wait for the UE to be handed over to the secondary base station.

Based on the foregoing technical solution, according to the method for handover between secondary base stations, the network device, and the user equipment that are provided in this embodiment of the present invention, the network device instructs each of the at least one candidate secondary base station to make the prior path handover preparation, so that the user equipment is handed over according to configuration information of each of the at least one candidate secondary base station when the user equipment needs path handover. Therefore, this embodiment of the present invention can relieve a problem of mobility deterioration resulting from frequent handover between cells because cell coverage of a secondary base station in a network is excessively small.

It should be understood that in this embodiment of the present invention, the processor 1201 may be a central processing unit (CPU), and the processor 1201 may alternatively be another general purpose processor, a digital signal processor (DSP), an application-specific integrated circuit (ASIC), a field programmable gate array (FPGA) or other programmable logic device, a discrete gate or transistor logic device, a discrete hardware component, or the like. The general purpose processor may be a microprocessor, or the processor may be any conventional processor or the like.

The memory 1202 may include a read-only memory and a random access memory, and provide the instruction and data for the processor 1201. A part of the memory 1202 may further include a non-volatile random access memory. For example, the memory 1202 may further store device type information.

The bus system 1203 may include not only a data bus but also a power bus, a control bus, a status signal bus, and the like. However, for clear description, various buses are denoted by the bus system 1203 in the figure.

During implementation, the steps of the methods may be implemented by an integrated logic circuit of hardware in the processor 1201 or by a software instruction. The steps of the methods disclosed with reference to the embodiments of the present invention may be directly implemented by a hardware processor, or may be implemented by a combination of hardware and a software module in a processor. The software module may be located in a random access memory, a flash memory, a read-only memory, a programmable read-only memory or an electrically erasable programmable memory, a register, or another mature storage medium in the art. The storage medium is located in the memory 1202, and the processor 1201 reads the information from the memory 1202 and implements, in combination with hardware of the processor 1201, the steps of the foregoing methods. To avoid repetition, no detailed description is provided herein again.

Optionally, in an embodiment, the transmitter 1204 is further configured to send a prior-preparation completion message to the first network device, where the prior-preparation completion message carries at least one of the following information: information about the access resource preconfigured by the network device for the UE or a TEID allocated by the network device to the UE.

Optionally, in an embodiment, the transmitter 1204 is further configured to send indication information to the first network device when the UE successfully accesses the network device, where the indication information is used to indicate that the UE has successfully accessed the network device.

Based on the foregoing technical solution, according to the method for handover between secondary base stations, the network device, and the user equipment that are provided in this embodiment of the present invention, the network device instructs each of the at least one candidate secondary base station to make the prior path handover preparation, so that the user equipment is handed over according to the configuration information of each of the at least one candidate secondary base station when the user equipment needs path handover. Therefore, this embodiment of the present invention can relieve a problem of mobility deterioration resulting from frequent handover between cells because cell coverage of a secondary base station in a network is excessively small.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be connections in electronic, mechanical, or other forms.

The units described as separate parts may or may not be physically separate. Parts displayed as units may or may not be physical units, and may be located in one position or distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or at least two units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for handover between secondary base stations, wherein the method comprises:
    sending, by a network device, a prior-preparation instruction to each of a plurality of candidate secondary base stations, wherein the prior-preparation instruction is used to instruct each of the plurality of candidate secondary base stations to make a path handover preparation, so that each of the plurality of candidate secondary base stations waits to be selected by user equipment (UE) as a target secondary base station, and the path handover preparation comprises at least one of the following: preconfiguring an access resource for the UE or establishing a data transmission channel with the network device;
    determining, by the network device, priority information of each of the plurality of candidate secondary base stations according to current state information of each of the plurality of candidate secondary base stations;
    sending, by the network device, the priority information of each of the plurality of candidate secondary base stations to the UE; and
    sending, by the network device, configuration information of each of the plurality of candidate secondary base stations to the UE, so that the UE is handed over to the target secondary base station in the plurality of candidate secondary base stations according to the priority information of each of the plurality of candidate secondary base stations and the configuration information of each of the plurality of candidate secondary base stations when the UE needs to be handed over between secondary base stations.

2. The method according to claim 1, wherein the configuration information of each of the plurality of candidate secondary base stations comprises at least one of the following:
    information about the access resource preconfigured by each candidate secondary base station for the UE or uplink grant information preconfigured by each candidate secondary base station for the UE.

3. The method according to claim 1, wherein the method further comprises:
    sending, by the network device, a first indication message to the UE, wherein the first indication message is used to indicate a handover trigger condition for handover of the UE, and the handover trigger condition comprises at least one of the following conditions:
    signal quality of a secondary base station that the UE currently accesses is lower than a first threshold;
    signal quality of a first candidate secondary base station in the plurality of candidate secondary base stations is higher than a second threshold;
    load of a secondary base station that the UE currently accesses is higher than a third threshold; or
    load quality of a second candidate secondary base station in the plurality of candidate secondary base stations is lower than a fourth threshold.

4. The method according to claim 1, wherein the method further comprises:

determining, by the network device, completion of an access process between the UE and the target secondary base station; and sending, by the network device, data to the target secondary base station, so that data transmission is performed between the UE and the target secondary base station.

5. A method for handover between secondary base stations, wherein the method comprises:

receiving, by user equipment (UE), configuration information of each of a plurality of candidate secondary base stations sent by a network device, wherein each of the plurality of candidate secondary base stations has made a path handover preparation and is waiting to be selected by the UE as a target secondary base station, and the path handover preparation comprises at least one of the following: preconfiguring an access resource for the UE or establishing a data transmission channel with the network device; and performing, by the UE, a hand over of the UE to the target secondary base station in the plurality of candidate secondary base stations according to the configuration information of each of the plurality of candidate secondary base stations when the UE needs to be handed over between secondary base stations, wherein the performing the hand over of the UE to the target secondary base station in the plurality of candidate secondary base stations according to the configuration information of each of the plurality of candidate secondary base stations when the UE needs to be handed over between secondary base stations comprises:

receiving, by the UE, an indication message sent by the network device, wherein the indication message carries priority information of each of the plurality of candidate secondary base stations;

determining, by the UE, the target secondary base station according to the priority information of each of the plurality of candidate secondary base stations; and performing, by the UE, the hand over of the UE to the target secondary base station according to the indication message and configuration information of the target secondary base station.

6. The method according to claim 5, wherein the configuration information of each of the plurality of candidate secondary base stations comprises at least one of the following:

information about the access resource preconfigured by each candidate secondary base station for the UE or uplink grant information preconfigured by each candidate secondary base station for the UE.

7. The method according to claim 5, wherein the method further comprises:

receiving another indication message sent by the network device, and determining, according to the another indication message, that the UE needs to be handed over between secondary base stations, wherein the another indication message is used to indicate a handover trigger condition for handover of the UE, and the trigger condition comprises at least one of the following conditions:

signal quality of a secondary base station that the UE currently accesses is lower than a first threshold;

signal quality of a first candidate secondary base station in the plurality of candidate secondary base stations is higher than a second threshold;

a load of a secondary base station that the UE currently accesses is higher than a third threshold; or a load of a second candidate secondary base station in the plurality of candidate secondary base stations is lower than a fourth threshold.

8. A network device, comprising:

at least one processor configured to:

determine to send prior-preparation instruction information to each of a plurality of candidate secondary base stations, wherein the prior-preparation instruction information is used to instruct each of the plurality of candidate secondary base stations to make a path handover preparation, so that each of the plurality of candidate secondary base stations waits to be selected by user equipment UE as a target secondary base station, and the path handover preparation comprises at least one of the following: preconfiguring an access resource for the UE or establishing a data transmission channel with the network device;

send the prior-preparation instruction information to each of the plurality of candidate secondary base stations;

determine priority information of each of the plurality of candidate secondary base stations according to current state information of each of the plurality of candidate secondary base stations;

send the priority information of each of the plurality of candidate secondary base stations to the UE; and send configuration information of each of the plurality of candidate secondary base stations to the UE, so that the UE is handed over to the target secondary base station in the plurality of candidate secondary base stations according to the priority information of each of the plurality of candidate secondary base stations and the configuration information of each of the plurality of candidate secondary base stations when the UE needs to be handed over between secondary base stations; and a memory coupled to the at least one processor.

9. The network device according to claim 8, wherein the configuration information of each of the plurality of candidate secondary base stations comprises at least one of the following:

information about the access resource preconfigured by each candidate secondary base station for the UE or uplink grant information preconfigured by each candidate secondary base station for the UE.

10. The network device according to claim 8, wherein the at least one processor is further configured to send a first indication message to the UE, wherein the first indication message is used to indicate a handover trigger condition for handover of the UE, and the handover trigger condition comprises at least one of the following conditions:

signal quality of a secondary base station that the UE currently accesses is lower than a first threshold;

signal quality of a first candidate secondary base station in the at least one candidate secondary base station is higher than a second threshold;

a load of a secondary base station that the UE currently accesses is higher than a third threshold; or signal quality of a second candidate secondary base station in the plurality of candidate secondary base stations is lower than a fourth threshold.

11. The network device according to claim 8, wherein the at least one processor is further configured to:

determine completion of an access process between the UE and the target secondary base station; and send data to the target secondary base station, so that data transmission is performed between the UE and the secondary base station.

12. An apparatus, comprising:
a memory; and
at least one processor coupled to the memory and configured to:
receive configuration information of each of a plurality of candidate secondary base stations sent by a network device, wherein each of the plurality of candidate secondary base stations has made a path handover preparation and is waiting to be selected by a terminal as a target secondary base station, and the path handover preparation comprises at least one of the following: preconfiguring an access resource for the terminal or establishing a data transmission channel with the network device;
receive an indication message sent by the network device, wherein the indication message carries priority information of each of the plurality of candidate secondary base stations;
determine the target secondary base station according to the priority information of each of the plurality of candidate secondary base stations; and
perform a hand over of the terminal to the target secondary base station in the plurality of candidate secondary base stations according to the priority information of each of the plurality of candidate secondary base stations and the configuration information of each of the plurality of candidate secondary base stations when the terminal needs to be handed over between secondary base stations.

13. The apparatus according to claim 12, wherein the configuration information of each of the plurality of candidate secondary base stations comprises at least one of the following:
information about the access resource preconfigured by each candidate secondary base station for the terminal or uplink grant information preconfigured by each candidate secondary base station for the terminal.

14. The apparatus according to claim 12, wherein the at least one processor is further configured to:
receive another indication message sent by the network device, and determine, according to the another indication message, that the terminal needs to be handed over between secondary base stations, wherein the another indication message is used to indicate a handover trigger condition for handover of the terminal, and the trigger condition comprises at least one of the following conditions:
signal quality of a secondary base station that the terminal currently accesses is lower than a first threshold;
signal quality of a first candidate secondary base station in the plurality of candidate secondary base stations is higher than a second threshold;
a load of a secondary base station that the terminal currently accesses is higher than a third threshold; or
a load of a second candidate secondary base station in the plurality of candidate secondary base stations is lower than a fourth threshold.

* * * * *